United States Patent
Adams et al.

(10) Patent No.: US 12,050,605 B2
(45) Date of Patent: Jul. 30, 2024

(54) INDEXED GEOSPATIAL PREDICATE SEARCH

(71) Applicant: Snowflake Inc., Bozeman, MT (US)

(72) Inventors: Matthias Carl Adams, Berlin (DE); Mahmud Allahverdiyev, Berlin (DE); Ismail Oukid, Berlin (DE); Peter Popov, Berlin (DE); Alejandro Salinger, Berlin (DE)

(73) Assignee: Snowflake Inc., Bozeman, MT (US)

( * ) Notice: Subject to any disclaimer, the term of this patent is extended or adjusted under 35 U.S.C. 154(b) by 85 days.

(21) Appl. No.: 17/804,248

(22) Filed: May 26, 2022

(65) Prior Publication Data

US 2022/0284025 A1 Sep. 8, 2022

Related U.S. Application Data

(63) Continuation-in-part of application No. 17/654,887, filed on Mar. 15, 2022, now Pat. No. 11,803,551, (Continued)

(51) Int. Cl.
*G06F 16/22* (2019.01)
*G06F 16/2455* (2019.01)
(Continued)

(52) U.S. Cl.
CPC .... *G06F 16/24557* (2019.01); *G06F 16/2272* (2019.01); *G06F 16/283* (2019.01); *G06F 16/9035* (2019.01); *G06F 17/18* (2013.01)

(58) Field of Classification Search
CPC .......... G06F 16/24557; G06F 16/2272; G06F 16/283; G06F 16/903; G06F 16/9035; G06F 16/29
See application file for complete search history.

(56) References Cited

U.S. PATENT DOCUMENTS

| | | | |
|---|---|---|---|
| 4,956,774 A | 9/1990 | Shibamiya et al. | |
| 6,154,572 A | 11/2000 | Chaddha | |

(Continued)

FOREIGN PATENT DOCUMENTS

| | | |
|---|---|---|
| CN | 113051351 A | 6/2021 |
| DE | 202020005734 U1 | 4/2022 |

(Continued)

OTHER PUBLICATIONS

"U.S. Appl. No. 17/654,887, Response filed Feb. 9, 2023 to Non Final Office Action mailed Nov. 10, 2022", 11 pgs.

(Continued)

*Primary Examiner* — Merilyn P Nguyen
(74) *Attorney, Agent, or Firm* — Schwegman Lundberg & Woessner, P.A.

(57) ABSTRACT

Provided herein are systems and methods for indexed geospatial predicate search. An example method performed by at least one hardware processor includes decoding a query with a geospatial predicate. The geospatial predicate is configured between a geography data column and a constant geography object. The method further includes computing a first covering for a data value of a plurality of data values in the geography data column. The first covering includes a first set of cells in a hierarchical grid representation of a geography. The first set of cells represents a surface of the geography associated with the data value. A second covering is computed for the constant geography object. A determination is made on whether to prune at least one partition of a database organized into a set of partitions and including the geography data column based on a comparison between the first covering and the second covering.

30 Claims, 29 Drawing Sheets

Related U.S. Application Data which is a continuation of application No. 17/358,154, filed on Jun. 25, 2021, now Pat. No. 11,308,089, which is a continuation of application No. 17/161,115, filed on Jan. 28, 2021, now Pat. No. 11,086,875, which is a continuation of application No. 16/932,462, filed on Jul. 17, 2020, now Pat. No. 10,942,925, which is a continuation of application No. 16/727,315, filed on Dec. 26, 2019, now Pat. No. 10,769,150.

(51) Int. Cl.
*G06F 16/28* (2019.01)
*G06F 16/9035* (2019.01)
*G06F 17/18* (2006.01)

(56) References Cited

U.S. PATENT DOCUMENTS

| | | | |
|---|---|---|---|
| 6,374,232 B1 | 4/2002 | Dageville et al. | |
| 6,571,233 B2 | 5/2003 | Beavin et al. | |
| 6,868,421 B1* | 3/2005 | Lin | G06F 16/29 707/E17.006 |
| 6,957,225 B1 | 10/2005 | Zait et al. | |
| 7,171,427 B2 | 1/2007 | Witkowski et al. | |
| 7,454,418 B1 | 11/2008 | Wang et al. | |
| 7,814,104 B2 | 10/2010 | Raghavan et al. | |
| 7,962,521 B2 | 6/2011 | Brown et al. | |
| 7,970,756 B2 | 6/2011 | Beavin et al. | |
| 8,209,178 B1 | 6/2012 | Talbot et al. | |
| 8,458,156 B1 | 6/2013 | Sharifi et al. | |
| 8,666,976 B2 | 3/2014 | Merz | |
| 8,887,286 B2 | 11/2014 | Dupont et al. | |
| 9,223,850 B2 | 12/2015 | Chen | |
| 9,298,726 B1 | 3/2016 | Mondal et al. | |
| 9,471,711 B2 | 10/2016 | Abadi et al. | |
| 9,507,825 B2 | 11/2016 | Baer et al. | |
| 9,514,187 B2 | 12/2016 | Ziauddin | |
| 9,684,671 B1 | 6/2017 | Dorin et al. | |
| 10,025,823 B2 | 7/2018 | Das et al. | |
| 10,311,062 B2 | 6/2019 | McPherson et al. | |
| 10,353,867 B1 | 7/2019 | Wong et al. | |
| 10,528,599 B1 | 1/2020 | Pandis et al. | |
| 10,628,418 B2 | 4/2020 | Weyerhaeuser et al. | |
| 10,635,671 B2 | 4/2020 | Sheng et al. | |
| 10,649,991 B2 | 5/2020 | Finlay et al. | |
| 10,685,052 B2 | 6/2020 | Winther | |
| 10,705,809 B2 | 7/2020 | Makkar | |
| 10,713,243 B2 | 7/2020 | Mathur | |
| 10,769,150 B1 | 9/2020 | Cruanes et al. | |
| 10,812,495 B2 | 10/2020 | Traore et al. | |
| 10,838,963 B2 | 11/2020 | Brodt et al. | |
| 10,860,832 B2 | 12/2020 | Wang | |
| 10,901,948 B2 | 1/2021 | Ackerman et al. | |
| 10,942,925 B1 | 3/2021 | Cruanes et al. | |
| 10,997,179 B1 | 5/2021 | Cruanes et al. | |
| 11,016,975 B1 | 5/2021 | Cruanes et al. | |
| 11,037,258 B2 | 6/2021 | Brenner et al. | |
| 11,042,650 B2 | 6/2021 | Fu et al. | |
| 11,074,261 B1 | 7/2021 | Pandis et al. | |
| 11,086,875 B2 | 8/2021 | Cruanes et al. | |
| 11,113,286 B2 | 9/2021 | Cruanes et al. | |
| 11,163,745 B2 | 11/2021 | Coleman et al. | |
| 11,176,133 B2 | 11/2021 | Horn et al. | |
| 11,194,793 B1 | 12/2021 | Srivastava et al. | |
| 11,194,808 B1* | 12/2021 | Adams | G06F 16/2462 |
| 11,308,089 B2 | 4/2022 | Cruanes et al. | |
| 11,308,090 B2 | 4/2022 | Allahverdiyev et al. | |
| 11,321,325 B2 | 5/2022 | Cruanes et al. | |
| 11,487,824 B2* | 11/2022 | Behnen | G06F 16/2255 |
| 11,803,551 B2 | 10/2023 | Cruanes et al. | |
| 2004/0243816 A1 | 12/2004 | Hacigumus et al. | |
| 2005/0120004 A1 | 6/2005 | Stata et al. | |
| 2005/0198076 A1 | 9/2005 | Stata et al. | |
| 2008/0294696 A1 | 11/2008 | Frandzel | |
| 2009/0070303 A1 | 3/2009 | Beavin et al. | |
| 2009/0100055 A1 | 4/2009 | Wang | |
| 2010/0125594 A1 | 5/2010 | Li et al. | |
| 2010/0281017 A1 | 11/2010 | Hu et al. | |
| 2010/0318519 A1 | 12/2010 | Hadjieleftheriou et al. | |
| 2011/0213775 A1 | 9/2011 | Franke et al. | |
| 2012/0054174 A1* | 3/2012 | Gagnier | G06F 16/2457 707/E17.054 |
| 2012/0109888 A1 | 5/2012 | Zhang et al. | |
| 2013/0073358 A1* | 3/2013 | Sandholm | G06F 16/29 707/E17.084 |
| 2013/0096841 A1 | 4/2013 | Kermani et al. | |
| 2013/0166553 A1 | 6/2013 | Yoon et al. | |
| 2013/0166557 A1 | 6/2013 | Fricke et al. | |
| 2013/0346720 A1 | 12/2013 | Colgrove et al. | |
| 2014/0114942 A1 | 4/2014 | Belakovskiy et al. | |
| 2014/0154352 A1 | 6/2014 | Altonen et al. | |
| 2014/0223565 A1 | 8/2014 | Cohen | |
| 2014/0280064 A1* | 9/2014 | McDougall | G06N 5/04 707/769 |
| 2014/0365424 A1 | 12/2014 | Herbst et al. | |
| 2015/0134670 A1 | 5/2015 | Liu et al. | |
| 2015/0254338 A1 | 9/2015 | Cheluvaraja et al. | |
| 2015/0269934 A1 | 9/2015 | Biadsy et al. | |
| 2015/0286681 A1 | 10/2015 | Baer et al. | |
| 2016/0026667 A1 | 1/2016 | Mukherjee et al. | |
| 2016/0162364 A1 | 6/2016 | Mutha et al. | |
| 2016/0196306 A1 | 7/2016 | Beavin et al. | |
| 2016/0292201 A1 | 10/2016 | Asaad et al. | |
| 2016/0299944 A1 | 10/2016 | Isaacson et al. | |
| 2016/0350347 A1 | 12/2016 | Das et al. | |
| 2016/0350375 A1 | 12/2016 | Das et al. | |
| 2016/0350392 A1 | 12/2016 | Rice et al. | |
| 2017/0060944 A1 | 3/2017 | Khayyat et al. | |
| 2017/0109295 A1 | 4/2017 | Lasperas et al. | |
| 2017/0116136 A1 | 4/2017 | Macnicol et al. | |
| 2017/0116271 A1 | 4/2017 | Ziauddin et al. | |
| 2017/0139989 A1 | 5/2017 | Weyerhaeuser et al. | |
| 2017/0193229 A1 | 7/2017 | Roychowdhury et al. | |
| 2017/0220652 A1 | 8/2017 | Kazi et al. | |
| 2017/0293649 A1 | 10/2017 | Finlay et al. | |
| 2017/0300862 A1 | 10/2017 | Bhadouria et al. | |
| 2017/0329801 A1* | 11/2017 | Rohlf | G06F 16/2246 |
| 2018/0052904 A1 | 2/2018 | Fusco et al. | |
| 2018/0068008 A1 | 3/2018 | Cruanes et al. | |
| 2018/0101540 A1 | 4/2018 | Stoop et al. | |
| 2018/0113889 A1 | 4/2018 | Brodt | |
| 2018/0275982 A1 | 9/2018 | Hunt et al. | |
| 2018/0285418 A1 | 10/2018 | Petropoulos et al. | |
| 2018/0307857 A1 | 10/2018 | Beecham et al. | |
| 2018/0336263 A1 | 11/2018 | Bensberg et al. | |
| 2019/0102441 A1 | 4/2019 | Malak et al. | |
| 2019/0130250 A1 | 5/2019 | Park et al. | |
| 2019/0137287 A1* | 5/2019 | Pazhayampallil | G06F 16/2379 |
| 2019/0205376 A1 | 7/2019 | Merhav et al. | |
| 2019/0220464 A1 | 7/2019 | Butani | |
| 2019/0303270 A1 | 10/2019 | Hoermann | |
| 2019/0332722 A1 | 10/2019 | Ogren et al. | |
| 2019/0370241 A1 | 12/2019 | Miraldo et al. | |
| 2020/0026788 A1 | 1/2020 | Bellamkonda et al. | |
| 2020/0117546 A1 | 4/2020 | Wong et al. | |
| 2020/0125674 A1 | 4/2020 | Arunski et al. | |
| 2020/0285761 A1 | 9/2020 | Buck et al. | |
| 2020/0373946 A1 | 11/2020 | Lee et al. | |
| 2021/0200772 A1 | 7/2021 | Cruanes et al. | |
| 2021/0216555 A1 | 7/2021 | Cruanes et al. | |
| 2021/0271644 A1 | 9/2021 | Chinthekindi et al. | |
| 2021/0319025 A1 | 10/2021 | Cruanes et al. | |
| 2021/0357411 A1 | 11/2021 | Cruanes et al. | |
| 2021/0365461 A1 | 11/2021 | Allahverdiyev et al. | |
| 2021/0397619 A1 | 12/2021 | Heimel et al. | |
| 2022/0012246 A1 | 1/2022 | Oukid et al. | |
| 2022/0012247 A1 | 1/2022 | Oukid et al. | |

(56) References Cited

U.S. PATENT DOCUMENTS

| | | | |
|---|---|---|---|
| 2022/0196784 A1* | 6/2022 | Wirola | G01S 5/02521 |
| 2022/0277013 A1 | 9/2022 | Cruanes et al. | |

FOREIGN PATENT DOCUMENTS

| | | |
|---|---|---|
| EP | 2434417 A1 | 3/2012 |
| WO | WO-2021/133433 A1 | 7/2021 |
| WO | WO-2022/016170 A1 | 1/2022 |

OTHER PUBLICATIONS

"U.S. Appl. No. 17/654,887, Notice of Allowance mailed Mar. 16, 2023", 9 pgs.

"U.S. Appl. No. 17/654,887, Non Final Office Action mailed Nov. 10, 2022", 18 pgs.

"U.S. Appl. No. 16/727,315, Examiner Interview Summary mailed Jun. 2, 2020", 3 pgs.

"U.S. Appl. No. 16/727,315, Non-Final Office Action mailed Mar. 2, 2020", 12 pgs.

"U.S. Appl. No. 16/727,315, Notice of Allowance mailed Jun. 8, 2020", 9 pgs.

"U.S. Appl. No. 16/727,315, Response Filed May 27, 2020 to Non-Final Office Action mailed Mar. 2, 2020", 14 pgs.

"U.S. Appl. No. 16/932,462, Examiner Interview Summary mailed Nov. 25, 2020", 3 pgs.

"U.S. Appl. No. 16/932,462, Non-Final Office Action mailed Aug. 21, 2020", 11 pgs.

"U.S. Appl. No. 16/932,462, Notice of Allowance mailed Dec. 15, 2020", 9 pgs.

"U.S. Appl. No. 16/932,462, Response filed Nov. 23, 2020 to Non-Final Office Action mailed Aug. 21, 2020", 12 pgs.

"U.S. Appl. No. 17/086,228, Non-Final Office Action mailed Dec. 28, 2020", 12 pgs.

"U.S. Appl. No. 17/086,228, Notice of Allowance mailed Jan. 22, 2021", 7 pgs.

"U.S. Appl. No. 17/086,228, Response filed Jan. 4, 2021 to Non-Final Office Action mailed Dec. 28, 2020", 8 pgs.

"U.S. Appl. No. 17/086,239, Non-Final Office Action mailed Dec. 17, 2020", 15 pgs.

"U.S. Appl. No. 17/086,239, Notice of Allowance mailed Apr. 9, 2021", 15 pgs.

"U.S. Appl. No. 17/086,239, Response filed Mar. 17, 2021 to Non-Final Office Action mailed Dec. 17, 2020", 12 pgs.

"U.S. Appl. No. 17/161,115, Corrected Notice of Allowability mailed Jun. 24, 2021", 2 pgs.

"U.S. Appl. No. 17/161,115, Final Office Action mailed Apr. 28, 2021", 17 pgs.

"U.S. Appl. No. 17/161,115, Non-Final Office Action mailed Mar. 23, 2021", 19 pgs.

"U.S. Appl. No. 17/161,115, Notice of Allowance mailed May 12, 2021", 8 pgs.

"U.S. Appl. No. 17/161,115, Response filed Apr. 15, 2021 to Non-Final Office Action mailed Mar. 23, 2021", 12 pgs.

"U.S. Appl. No. 17/161,115, Response filed Apr. 30, 2021 to Final Office Action mailed Apr. 28, 2021", 8 pgs.

"U.S. Appl. No. 17/218,962, Corrected Notice of Allowability mailed Jul. 12, 2021", 2 pgs.

"U.S. Appl. No. 17/218,962, Non-Final Office Action mailed Jun. 4, 2021", 21 pgs.

"U.S. Appl. No. 17/218,962, Notice of Allowance mailed Jul. 2, 2021", 8 pgs.

"U.S. Appl. No. 17/218,962, Response filed Jun. 10, 2021 to Non-Final Office Action mailed Jun. 4, 2021", 9 pgs.

"U.S. Appl. No. 17/358,154, Corrected Notice of Allowability mailed Mar. 2, 2022", 2 pgs.

"U.S. Appl. No. 17/358, 154, Non-Final Office Action mailed Oct. 20, 2021", 24 pgs.

"U.S. Appl. No. 17/358,154, Notice of Allowance mailed Feb. 14, 2022", 9 pgs.

"U.S. Appl. No. 17/358,154, Response filed Jan. 17, 2022 to Non-Final Office Action mailed Oct. 20, 2021", 11 pgs.

"U.S. Appl. No. 17/388,160, Non-Final Office Action mailed Dec. 6, 2021", 24 pgs.

"U.S. Appl. No. 17/388, 160, Notice of Allowance mailed Mar. 2, 2022", 10 pgs.

"U.S. Appl. No. 17/388,160, Response filed Jan. 28, 2022 to Non-Final Office Action mailed Dec. 6, 2021", 10 pgs.

"U.S. Appl. No. 17/394,149, Non-Final Office Action mailed Dec. 13, 2021", 18 pgs.

"U.S. Appl. No. 17/394,149, Notice of Allowance mailed Feb. 18, 2022", 9 pgs.

"U.S. Appl. No. 17/394,149, Response filed Jan. 28, 2022 to Non-Final Office Action mailed Dec. 13, 2021", 10 pgs.

"U.S. Appl. No. 17/462,796, Examiner Interview Summary mailed Mar. 22, 2022", 2 pgs.

"U.S. Appl. No. 17/462,796, Non-Final Office Action mailed Dec. 21, 2021", 18 pgs.

"U.S. Appl. No. 17/462,796, Notice of Allowance mailed Apr. 20, 2022", 8 pgs.

"U.S. Appl. No. 17/462,796, Response filed Mar. 21, 2022 to Non-Final Office Action mailed Dec. 21, 2021", 12 pgs.

"U.S. Appl. No. 17/484,817, Corrected Notice of Allowability mailed Jan. 20, 2022", 2 pgs.

"U.S. Appl. No. 17/484,817, Non-Final Office Action mailed Oct. 29, 2021", 35 pgs.

"U.S. Appl. No. 17/484,817, Notice of Allowance mailed Jan. 11, 2022", 10 pgs.

"U.S. Appl. No. 17/484,817, Response filed Nov. 30, 2021 to Non-Final Office Action mailed Oct. 29, 2021", 10 pgs.

"U.S. Appl. No. 17/486,426, Non-Final Office Action mailed Nov. 22, 2021", (16 pgs.).

"U.S. Appl. No. 17/486,426, Notice of Allowance mailed Dec. 27, 2021", 9 pgs.

"U.S. Appl. No. 17/486,426, Response filed Nov. 30, 2021 to Non Final Office Action mailed Nov. 22, 2021", 10 pgs.

"U.S. Appl. No. 17/655,124, Non-Final Office Action mailed May 4, 2022", 14 pgs.

"European Application Serial No. 20216097.4, Extended European Search Report mailed May 20, 2021", 7 pgs.

"European Application Serial No. 20216097.4, Response filed Dec. 22, 2021 to Extended European Search Report mailed May 20, 2021", 32 pgs.

"Indian Application Serial No. 202044053756, First Examination Report mailed Dec. 21, 2021", 6 pgs.

"International Application Serial No. PCT/US2020/044199, International Search Report mailed Aug. 26, 2020", 2 pgs.

"International Application Serial No. PCT/US2020/044199, Written Opinion mailed Aug. 26, 2020", 6 pgs.

"International Application Serial No. PCT/US2021/070808, International Search Report mailed Jul. 26, 2021", 2 pgs.

"International Application Serial No. PCT/US2021/070808, Written Opinion mailed Jul. 26, 2021", 3 pgs.

"U.S. Appl. No. 17/654,887, Corrected Notice of Allowability mailed Aug. 31, 2023", 2 pgs.

* cited by examiner

| PARTITION# (4 BYTES) | SLICE NUMBER | SUMMARY TYPE (1 BYTE) | HASH # (1 BYTE) | BLOOM[0] (8 BYTES) | ... | BLOOM[N] (8 BYTES) |
|---|---|---|---|---|---|---|
| P000 | 0 | B | 20 | 00101 | | 0101 |
| P002 | 0 | B | 20 | 10010 | | 1110 |
| ... | | | | | | |
| P1001 | 0 | B | 20 | 00101 | | 0011 |
| P1001 | 0 | B | 20 | 10010 | | 1100 |

FIG. 5

```
for geometry in partition:
    covering = calculateCovering (geometry)
    for cell in covering:
        index (cell, SEED_CELLS)
        for parent in calculateParents (cell):
            index(parent, SEED_PARENT)
```

```
def mayIntersect (G, index):
    for cell in calculateCovering (G):
        if index.contains (cell, SEED_CELLS) or index.contains (cell, SEED_PARENT):
            return True
    for parent in calculateParents (cell):
        if index.contains (parent, SEED_CELLS):
            return True
    return False
```

```
G may contain or cover one the geometries in the index def mayContain (G, index):
    for cell in calculateCovering (G):
        if index.contains (cell, SEED_CELLS) or index.contain (cell, SEED_PARENT):
            return True no need to check parents return False
```

FIG. 26

```
G may be within (contained in) if all of the geometries are in the index def mayBeWithin (G, index):
    for cell in calculateCovering (G):
        if not index.contains (cell, SEED_CELLS):
            parentInIndex = False
            for parent in calculateParents (cell):
                parentInIndex |= index.contains (parent, SEED_CELLS):
            if not parentInIndex
                return False
    return True
```

FIG. 27

INDEXED GEOSPATIAL PREDICATE SEARCH

CROSS-REFERENCE TO RELATED APPLICATIONS

The present application is a continuation-in-part of U.S. Non-Provisional Patent Application Ser. No. 17/654,887, entitled "PRUNING INDEX GENERATION AND ENHANCEMENT," filed on Mar. 15, 2022, now issued as U.S. Pat. No. 11,803,551.

TECHNICAL FIELD

Embodiments of the disclosure relate generally to databases and, more specifically, to indexed geospatial predicate searches as well as configuring search indexes (such as pruning indexes) to enhance database query processing in a cloud computing architecture.

BACKGROUND

Databases are widely used for data storage and access in computing applications. A goal of database storage is to provide enormous sums of information in an organized manner so that it can be accessed, managed, and updated. In a database, data may be organized into rows, columns, and tables. Databases are used by various entities and companies for storing information that may need to be accessed or analyzed.

A cloud database system (also referred to as a "network-based database system") is a network architecture used for data analysis and reporting that comprises a central repository of integrated data from one or more disparate sources. A cloud database system can store current and historical data that can be used for creating analytical reports for an enterprise based on data stored within the databases of the enterprise. To this end, database systems typically provide business intelligence tools, tools to extract, transform, and load data into the repository, and tools to manage and retrieve metadata.

When certain information is to be extracted from a database, a query statement may be executed against the database data. A network-based database system processes the query and returns certain data according to one or more query predicates that indicate what information should be returned by the query. The network-based database system extracts specific data from the database and formats that data into a readable form. However, it can be challenging to execute queries on a very large table because a significant amount of time and computing resources are required to scan an entire table to identify data that satisfies the query. For example, it can be challenging to execute queries with geography predicates associated with geography data types (e.g., geospatial data and geospatial objects) as processing such data types is time and resource-intensive.

BRIEF DESCRIPTION OF THE DRAWINGS

The present disclosure will be understood more fully from the detailed description given below and from the accompanying drawings of various embodiments of the disclosure.

FIG. 5 illustrates a portion of an example pruning index, in accordance with some embodiments of the present disclosure.

FIG. 20 is a diagram of an example pseudo-code for indexing geospatial objects, in accordance with some embodiments of the present disclosure.

FIG. 25 is a diagram of an example pseudo-code for processing a query with a geospatial predicate of ST_INTERSECT, in accordance with some embodiments of the present disclosure.

FIG. 26 is a diagram of an example pseudo-code for processing a query with a geospatial predicate of ST_CONTAINS or ST_COVERS, in accordance with some embodiments of the present disclosure.

FIG. 27 is a diagram of an example pseudo-code for processing a query with a geospatial predicate of ST_WITHIN or ST_COVEREDBY, in accordance with some embodiments of the present disclosure.

DETAILED DESCRIPTION

Figure 1:
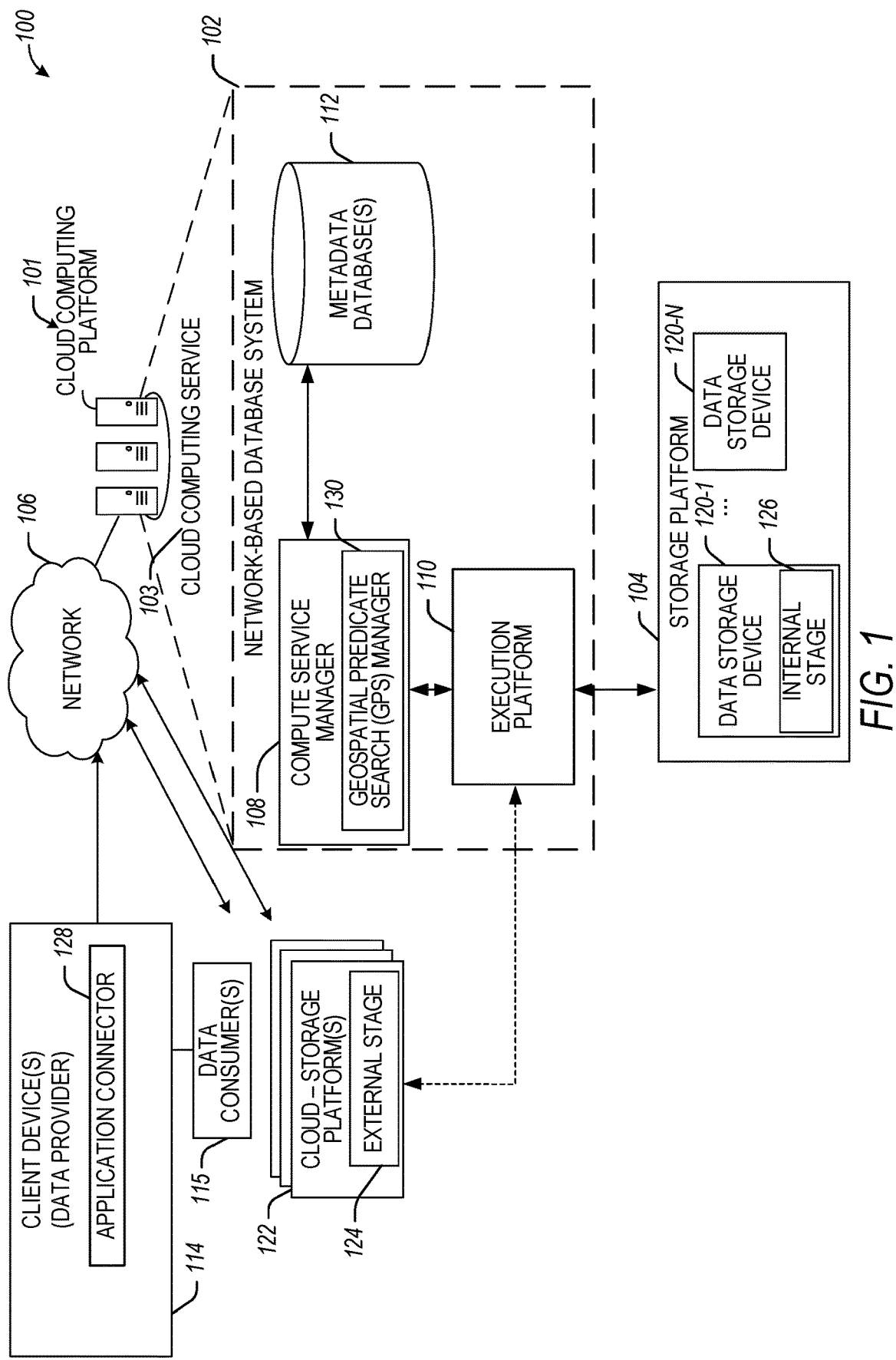
FIG. 1 illustrates an example computing environment that includes a network-based database system in communication with a cloud storage platform, in accordance with some embodiments of the present disclosure.

Reference will now be made in detail to specific example embodiments for carrying out the inventive subject matter. Examples of these specific embodiments are illustrated in the accompanying drawings, and specific details are outlined in the following description to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

As noted above, processing queries directed to very large tables is challenging because a significant amount of time and computing resources are required to scan an entire table to identify data that satisfies the query. Examples of such queries include queries with geospatial predicates. Therefore, it can be desirable to execute a query with geospatial predicates without scanning the entire table. Aspects of the present disclosure address the above and other challenges in processing queries with geospatial predicates on large tables including geography-based data by creating a search index (also referred to as a pruning index) that may be used to construct a reduced scan set for processing a query. More specifically, a large source table may be organized into a set of micro-partitions, and a pruning index can be created for the source table to be used in identifying a subset of the micro-partitions to scan to identify data that satisfies the query with the geospatial predicates.

In the present disclosure, physical units of data that are stored in a data platform—and that make up the content of, e.g., database tables in customer accounts—are referred to as micro-partitions. In different implementations, a data platform may store metadata in micro-partitions as well. The term "micro-partitions" is distinguished in this disclosure from the term "files," which, as used herein, refers to data units such as image files (e.g., Joint Photographic Experts Group (JPEG) files, Portable Network Graphics (PNG) files, etc.), video files (e.g., Moving Picture Experts Group (MPEG) files, MPEG-4 (MP4) files, Advanced Video Coding High Definition (AVCHD) files, etc.), Portable Document Format (PDF) files, documents that are formatted to be compatible with one or more word-processing applications, documents that are formatted to be compatible with one or more spreadsheet applications, and/or the like. If stored internal to the data platform, a given file is referred to herein as an "internal file" and may be stored in (or at, or on, etc.) what is referred to herein as an "internal storage location." If stored external to the data platform, a given file is referred to herein as an "external file" and is referred to as being stored in (or at, or on, etc.) what is referred to herein as an "external storage location." These terms are further discussed below.

Computer-readable files come in several varieties, including unstructured files, semi-structured files, and structured files. These terms may mean different things to different people. As used herein, examples of unstructured files include image files, video files, PDFs, audio files, and the like; examples of semi-structured files include JavaScript Object Notation (JSON) files, eXtensible Markup Language (XML) files, and the like; and examples of structured files include Variant Call Format (VCF) files, Keithley Data File (KDF) files, Hierarchical Data Format version 5 (HDF5) files, and the like. As known to those of skill in the relevant arts, VCF files are often used in the bioinformatics field for storing, e.g., gene-sequence variations, KDF files are often used in the semiconductor industry for storing, e.g., semiconductor-testing data, and HDF5 files are often used in industries such as the aeronautics industry, in that case for storing data such as aircraft-emissions data. Numerous other examples of unstructured-file types, semi-structured-file types, and structured-file types, as well as example uses thereof, could certainly be listed here as well and will be familiar to those of skill in the relevant arts. Different people of skill in the relevant arts may classify types of files differently among these categories and may use one or more different categories instead of or in addition to one or more of these.

A geography data object could include a collection of multiple geography data objects such as points, linestrings, polygons, and/or the like. An organization known as the Open Geospatial Consortium (OGC) publishes standards for the storage and processing of geospatial data in relational databases. Two such standards are (i) the OpenGIS® Implementation Standard No. OGC 06-103r4, Version 1.2.1, entitled "OpenGIS® Implementation Standard for Geographic information—Simple feature access—Part 1: Common architecture" (28 May 2011) and (ii) the OpenGIS® Implementation Standard No. OGC 06-104r4, Version 1.2.1, entitled "OpenGIS® Implementation Standard for Geographic information—Simple feature access—Part 2: SQL option" (4 Aug. 2010). The OGC also defines an eXtensible Markup Language (XML) format known as the Geography Markup Language (GML) for the expression of geographical features. Other formats for encoding geographical features include well-known text (WKT), well-known binary (WKB), and GeoJSON, which is an open standard format designed for representing simple geographical features. GeoJSON is based on JavaScript Object Notation (JSON).

In a given format that is used for representing geographical features, a point is typically represented as a set of coordinates in a coordinate system. Some examples may be discussed and illustrated in the context of two-dimensional (2D) geometry and geography. Examples, concepts, principles, etc. that are discussed herein can be extendable to three-dimensional (3D) (and higher-dimensional) geometries and geographies as well. In 2D, a point is represented as a pair of coordinates. In Cartesian domains, a point may be given by an {x, y} pair, where x and y each represent a linear distance from the origin along their respective axis in a unit of measure such as meters, kilometers, feet, miles, and/or the like. As used herein, the term "geometry" indicates shapes that are defined in Cartesian space with {x, y} coordinates. As used herein, the term "geography" refers to shapes that are defined on a sphere representing the Earth, with latitude and longitude coordinates. The present disclosure related to S2 concepts applies to geography (since S2 concepts only apply to a sphere).

In what is known as Earth domains, a point may be given by a {longitude, latitude} pair. By convention, x and y in Cartesian domains correspond respectively with longitude and latitude in Earth domains, and that convention is followed in this disclosure. Longitude and latitude are typically expressed in degrees, with longitude ranging between −180 and 180 degrees and latitude ranging between −90 and 90 degrees. Furthermore, the line of longitude at 0 degrees longitude is known as the Prime Meridian, and the line of longitude that is at both −180 and 180 degrees longitude is known as the Antimeridian. Positive longitude values are those east of the Prime Meridian up to the Antimeridian, and negative longitude values are those west of the Prime Meridian up to the Antimeridian. The Equator is at 0 degrees latitude, and the North and South Poles are at 90 and −90 degrees latitude, respectively.

In various implementations, the surface of the Earth may be modeled as a plane, a sphere, or an ellipsoid, the latter of which is also known as a spheroid. The shape of line segments (between, e.g., a given pair of points) is different in these different Earth-domain models. As a general matter, among these three types of Earth-domain models, the actual shape of the Earth is generally most accurately represented by an ellipsoidal model in which (i) the Equator is longer than it is in a spherical model and (ii) the North Pole and the South Pole are both closer to the center of the Earth than they are in a spherical model. Conversely, among these three types of Earth-domain models, the actual shape of the Earth is generally least accurately represented by planar models, with the lack of accuracy generally becoming more and more pronounced over greater and greater distances from the Equator. In some of the examples that are discussed herein (e.g., in connection with S2 spatial indexing), a spherical model of Earth is used by way of illustration with the understanding that other models could be used. In Earth domains, coordinates are, as discussed above, typically expressed in terms of degrees whereas distances are typically expressed using units of measure such as meters, kilometers, feet, miles, and/or the like. In Cartesian domains, both distances and coordinates are typically expressed using such units of measure.

The OGC standards define various complex geospatial functions (also referred to as geospatial predicates) with agreed-upon semantics. Examples of these geospatial predicates include ST_Covers, ST_CoveredBy, ST_Contains, ST_Within, ST_Distance, ST_DWithin, ST_Intersects, ST_Equals, ST_Touches, ST_Crosses, and ST_Buffer. The "ST" prefix on each geospatial predicate name has evolved in recent years to become a de facto abbreviation for "Spatial Type," though it originally was an abbreviation for "Spatial and Temporal." As used herein by way of example, the semantics of these various geospatial predicates are as follows, where "g" represents a given geography data object, where "g1" and "g2" represent two different geography data objects, and where "d" represents a distance.

ST_Covers (g1, g2) returns [true] if every point in g2 is either within or touching the perimeter of g1 and otherwise returns [false];

ST_CoveredBy (g1, g2) is equivalent to ST_Covers (g2, g1);

ST_Contains (g1, g2) returns [true] if every point in g2 is within the perimeter of g1 (but there could be points touching the perimeter, only that at least one point is in the interior and not touching the perimeter), and otherwise returns [false];

ST_Within (g1, g2) is equivalent to ST_Contains (g2, g1);

ST_Distance (g1, g2) returns the shortest distance between g1 and g2;

ST_Distance (g1, g2)<(or <=) d returns [true] if ST_Distance (g1, g2) is less than (or less than or equal to) d, and otherwise returns [false] (as used herein, "<=" is equivalent to "≤" and to the language "less than or equal to");

ST_DWithin (g1, g2, d) returns [true] if ST_Distance (g1, g2) is less than or equal to d, and otherwise returns [false];

ST_Intersects (g1, g2) returns [true] if g1 and g2 have at least one point in common, and otherwise returns [false];

ST_Equals (g1, g2) returns [true] if every point of g1 is also a point of g2 and vice versa, and otherwise returns [false];

ST_Touches (g1, g2) returns [true] if (a) at least one edge point of g1 is also an edge point of g2 and (b) there are no points in common between the interior of g1 and the interior of g2, and otherwise returns [false];

ST_Crosses (g1, g2) returns [true] if (a) at least one point is an interior point of both g1 and g2 and (b) at least one interior point of at least one of g1 and g2 is not an interior point of the other of g1 and g2, and otherwise returns [false]; and ST_Buffer (g, d) returns a geography data object that contains all points that are less than or equal to (i.e., at most) d from g.

Other geospatial predicates could be listed here, as these are just examples. It is noted that some examples of various ones of these functions replace "g," "g1," and/or "g2" with one or more expressions such as "left.g" and "right.g," where "left" and "right" represent relations (also referred to as relational expressions) and where the "g" in this ".g" usage represents a geography data object that may be contained in a column of the associated relation, may be represented by a combination of multiple columns of the associated relation or may be an output of a function performed on one or more columns of the associated relation, among other possibilities. As used herein, as mentioned, a relation could take on one of several different forms, some examples of which are a table, an output of another operator in a query-execution plan, an inline view, a subquery, a materialized view, a stream of rows, another object having a plurality of rows, and/or the like.

As discussed herein, a "micro-partition" is a batch unit, and each micro-partition has contiguous units of storage. By way of example, each micro-partition may contain between 50 MB and 500 MB of uncompressed data (note that the actual size in storage may be smaller because data may be stored compressed). Groups of rows in tables may be mapped into individual micro-partitions organized in a columnar fashion. This size and structure allow for an extremely granular selection of the micro-partitions to be scanned, which can be comprised of millions, or even hundreds of millions, of micro-partitions. This granular selection process for micro-partitions to be scanned is referred to herein as "pruning." Pruning involves using metadata to determine which portions of a table, including which micro-partitions or micro-partition groupings in the table, are not pertinent to a query, and then avoiding those non-pertinent micro-partitions when responding to the query and scanning only the pertinent micro-partitions to respond to the query. Metadata may be automatically gathered about all rows stored in a micro-partition, including the range of values for each of the columns in the micro-partition; the number of distinct values; and/or additional properties used for both optimization and efficient query processing. In one embodiment, micro-partitioning may be automatically performed on all tables. For example, tables may be transparently partitioned using the ordering that occurs when the data is inserted/loaded. However, it should be appreciated that this disclosure of the micro-partition is exemplary only and should be considered non-limiting. It should be appreciated that the micro-partition may include other database storage devices without departing from the scope of the disclosure.

Consistent with some embodiments, a network-based data warehouse system may generate a pruning index for a source table and use the pruning index to prune micro-partitions of the source table when processing queries directed to the source table. In generating a pruning index, the network-based data warehouse system generates a filter for each micro-partition of the source table that indexes distinct values in each column of the micro-partition of the source table. The filter may, for example, comprise a blocked bloom filter, a bloom filter, a hash filter, or a cuckoo filter.

When a query comprising an equality predicate is received, rather than scanning the entire source table to evaluate the equality predicate, the network-based data warehouse system probes the pruning index to identify a reduced scan set of micro-partitions comprising only a sub-set of the micro-partitions of the source table, and only the reduced scan set of micro-partitions is scanned when executing the query.

By using a pruning index to prune the set of micro-partitions to scan in executing a query, the network-based data warehouse accelerates the execution of point queries on large tables when compared to conventional methodologies. Using a pruning index in this manner also guarantees a constant overhead for any equality predicate on the table. Additional benefits of pruning index utilization in data warehouses include, but are not limited to, an ability to support other types of predicates, an ability to quickly compute the number of distinct values in a table, and the ability to support join pruning.

A geography data type (e.g., geospatial data or geospatial objects) can be used to represent geospatial features on the Earth's surface. Various functions to operate on geography data can be supported, including predicates to determine the relationship between objects such as intersection and containment. An example of a query using a geography predicate is the following:

```
select * from table
where st_contains(<constant>, table.geography),
``` where table.geography is a table or column of type geography (also referred to as geography data column) and <constant> is a constant geography object (e.g., a point, a line, a polygon, or a combination thereof) (also referred to as a geospatial object, a geography object, or geography). As used herein, the term "geography data column" indicates data of a geography data type, including geospatial data of the following type—longitude and latitude, Well-Known Text (WKT), Well-Known Binary (WKB), Extended WKT (EWKT), Extended WKB (EWKB), Internet Engineering Task Force (IETF) geospatial data Javascript Object Notation (GeoJSON). A geography data type can also store the following types of geospatial objects— WKT/WKB/EWKT/EWKB/GeoJSON geospatial objects (e.g., point, multipoint, linestring, multi-linestring, polygon, multi-polygon, geometric collection) and GeoJSON-specific geospatial objects (e.g., feature and feature collection).

The disclosed techniques can be used for configuring a search index (e.g., a pruning index) when executing queries containing geography predicates such as ST_INTERSECTS, ST_CONTAINS, ST_WITHIN, ST_COVERS, and ST_COVEREDBY improving the performance of queries that use these predicates. More specifically, a network-based database system may generate a search index (e.g., a pruning index) for a source table and use the pruning index to prune micro-partitions of the source table when processing queries with geospatial predicates directed to the source table. In generating a pruning index, the network-based database system generates a filter for each micro-partition of the source table that indexes distinct values in each column of the micro-partition of the source table. The filter may, for example, comprise a blocked bloom filter, a bloom filter, a hash filter, or a cuckoo filter.

As used herein, the term "covering" indicates a set of cells (e.g., cells in a spatial indexing scheme such as S2) representing an object (e.g., a geospatial object on the surface of the Earth). A covering can include cells at different levels of the spatial indexing scheme, with the set of cells covering a surface of the object when interposed over the object.

When a query with a geospatial predicate is received (where the geospatial predicate specifies a geography data column and a constant geography object), the disclosed techniques are used to index the geography data column using a spatial indexing scheme (e.g., S2 indexing scheme as described at http://s2geometry.io) to determine hash functions of cells associated with the geography data column (e.g., the set of cells forming the covering as well as one or more parent cells of the cells forming the covering). The hash functions can be added to the filter (e.g., Bloom filter) of the search index (or pruning index). This modification of the search index can be performed a priori (e.g., before the query with the geospatial predicate is received). After the query is received, the disclosed techniques are also used to index the constant geography object (e.g., from a geography object in the query) using the spatial indexing scheme to determine hash functions of cells associated with the geography object (e.g., the set of cells forming the covering as well as one or more parent cells). Rather than scanning the entire source table with the geography data column to evaluate the predicate, the network-based database system probes the pruning index to identify a reduced scan set of micro-partitions comprising only a subset of the micro-partitions of the source table, and only the reduced scan set of micro-partitions is scanned when executing the query with the geospatial predicate. The reduced scan set can be generated by pruning associated partitions based on a comparison of the hash functions associated with the constant geography object with the hash functions associated with the geography data column that are part of the filter of the search index (e.g., a Bloom filter of the pruning index).

Before the disclosed techniques, processing of predicates on geography data uses the comparison of all objects of a geography column to a given constant geography, which is time-consuming. More specifically, the computation of a geography predicate required a full table scan to compare all geography objects in a column to a query object (modulo smart scan). In this regard, in some cases, a full table scan can be avoided if another predicate in the query is determined not to produce any results for some partition, so the geography predicate would not be evaluated, and hence not all geography objects would be compared.

Other solutions to speed up the computation of spatial queries include the use of spatial data structures like R-trees, Quadtrees, or kd-trees. These structures recursively divide the space to represent a set of geometry objects and can answer queries like containment, range, and nearest-neighbor search. Such techniques are also time-consuming and challenging to distribute.

By configuring a pruning index using the disclosed techniques (e.g., including hash functions of a set of cells forming a covering of an object or a geography data column as well as the hash functions of the parent cells), the pruning index can be updated and used to determine if a partition may contain a geography object that satisfies a predicate. In this regard, the pruning index is used to prune a set of micro-partitions to scan in executing a query containing a geospatial predicate. By using the disclosed techniques, a network-based database system can accelerate the execution of queries with geospatial predicates on large tables when compared to conventional methodologies, potentially leading to significant performance improvements. Improvements are larger when only a few table partitions contain data that matches the predicate for the given geometry object. Using a pruning index in this manner also guarantees a constant overhead for any equality predicate on the table. Additional benefits of pruning index utilization in database systems include but are not limited to, an ability to support other types of predicates, an ability to quickly compute the number of distinct values in a table, and the ability to support join pruning.

Compared to tree-based data structures, in which the representation of each object in the structure depends on the spatial relation to other objects in the represented set, the disclosed techniques are based on a fixed grid representation of space. For example, a fixed hierarchical cell structure can be used where each cell can be uniquely identified. Geometries are then approximated by the cells they intersect. An example spatial indexing scheme used by the disclosed techniques is the S2 indexing scheme, however, other schemes may be used as well (e.g., Geohash and H3). The use of the spatial indexing scheme allows for use of fixed cell IDs to be represented in the search index (e.g., via hash functions), and to then probe the index with the cell ids corresponding to the constant geometry in the query. Other drawbacks of tree-based methods are that such methods are not well suited for a cloud storage-based environment.

The various embodiments that are described herein are described with reference where appropriate to one or more of the various figures. An example computing environment using a geospatial predicate search (GPS) manager for configuring a search index (e.g., a pruning index) for processing queries with geospatial predicates is discussed in connection with FIGS. 1-3. A more detailed description of techniques related to pruning index configuration is provided in connection with FIGS. 4-13. A more detailed description of the techniques for an indexed geospatial predicate search is provided in connection with FIG. 14-FIG. 28. A more detailed discussion of example computing devices that may be used in connection with the disclosed techniques is provided in connection with FIG. 29.

FIG. 1 illustrates an example computing environment 100 that includes a database system in the example form of a network-based database system 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform. For example, in some aspects, the computing environment 100 may include a cloud computing platform 101 with the network-based database system 102, and storage platforms 104 (also referred to as cloud storage platforms). The cloud computing platform 101 provides computing resources and storage resources that may be acquired (purchased) or leased (e.g., by data providers and data consumers), and configured to execute applications and store data.

The cloud computing platform 101 may host a cloud computing service 103 that facilitates storage of data on the cloud computing platform 101 (e.g., data management and access) and analysis functions (e.g., SQL queries, analysis), as well as other processing capabilities (e.g., performing identity resolution and data enrichment functions described herein). The cloud computing platform 101 may include a three-tier architecture: data storage (e.g., storage platforms 104 and 122), an execution platform 110, and a compute service manager 108 providing cloud services (e.g., geospatial predicate search configuration and processing as performed by the GPS manager 130).

It is often the case that organizations that are customers of a given data platform also maintain data storage (e.g., a data lake) that is external to the data platform (i.e., one or more external storage locations). For example, a company could be a customer of a particular data platform and also separately maintain storage of any number of files—be they unstructured files, semi-structured files, structured files, and/or files of one or more other types—on, as examples, one or more of their servers and/or on one or more cloud-storage platforms such as AMAZON WEB SERVICES™ (AWS™), MICROSOFT® AZURE®, GOOGLE CLOUD PLATFORM™, and/or the like. The customer's servers and cloud-storage platforms are both examples of what a given customer could use as what is referred to herein as an external storage location. The cloud computing platform 101 could also use a cloud-storage platform as what is referred to herein as an internal storage location concerning the data platform.

From the perspective of the network-based database system 102 of the cloud computing platform 101, one or more files that are stored at one or more storage locations are referred to herein as being organized into one or more of what is referred to herein as either "internal stages" or "external stages." Internal stages are stages that correspond to data storage at one or more internal storage locations, and where external stages are stages that correspond to data storage at one or more external storage locations. In this regard, external files can be stored in external stages at one or more external storage locations, and internal files can be stored in internal stages at one or more internal storage locations, which can include servers managed and controlled by the same organization (e.g., company) that manages and controls the data platform, and which can instead or in addition include data-storage resources operated by a storage provider (e.g., a cloud-storage platform) that is used by the data platform for its "internal" storage. The internal storage of a data platform is also referred to herein as the "storage platform" of the data platform. It is further noted that a given external file that given customer stores at a given external storage location may or may not be stored in an external stage in the external storage location—i.e., in some data-platform implementations, it is a customer's choice whether to create one or more external stages (e.g., one or more external-stage objects) in the customer's data-platform account as an organizational and functional construct for conveniently interacting via the data platform with one or more external files.

As shown, the network-based database system 102 of the cloud computing platform 101 is in communication with the cloud storage platforms 104 and 122 (e.g., AWS®, Microsoft Azure Blob Storage®, or Google Cloud Storage), client device 114 (e.g., a data provider), and data consumer 115 via network 106. The network-based database system 102 is a network-based system used for reporting and analysis of integrated data from one or more disparate sources including one or more storage locations within the cloud storage platform 104. The cloud storage platform 104 comprises a plurality of computing machines and provides on-demand computer system resources such as data storage and computing power to the network-based database system 102.

The network-based database system 102 comprises a compute service manager 108, an execution platform 110, and one or more metadata databases 112. The network-based database system 102 hosts and provides data reporting and analysis services (as well as additional services such as the disclosed identity resolution and data enrichment functions) to multiple client accounts, including an account of the data provider associated with client device 114 and an account of the data consumer 115. In some embodiments, the compute service manager 108 comprises the GPS manager 130 which can be used to configure and perform an indexed geospatial predicate search, including configuring (or updating/modifying) a filter of a search index (e.g., a pruning index) using hashing functions (e.g., in connection with processing queries with geospatial predicates). A more detailed description of the functions provided by the GPS manager 130 is provided in connection with FIGS. 14-28.

The compute service manager 108 coordinates and manages operations of the network-based database system 102. The compute service manager 108 also performs query optimization and compilation as well as managing clusters of computing services that provide compute resources (also referred to as "virtual warehouses"). The compute service manager 108 can support any number of client accounts such as end-users providing data storage and retrieval requests, accounts of data providers, accounts of data consumers, system administrators managing the systems and methods described herein, and other components/devices that interact with the compute service manager 108.

The compute service manager 108 is also in communication with a client device 114. The client device 114 corresponds to a user of one of the multiple client accounts (e.g., a data provider) supported by the network-based database system 102. The data provider may utilize application connector 128 at the client device 114 to submit data storage, retrieval, and analysis requests to the compute service manager 108 as well as to access or configure other services provided by the compute service manager 108 (e.g., processing of queries with geospatial predicates).

Client device 114 (also referred to as user device 114) may include one or more of a laptop computer, a desktop computer, a mobile phone (e.g., a smartphone), a tablet computer, a cloud-hosted computer, cloud-hosted serverless processes, or other computing processes or devices may be used to access services provided by the cloud computing platform 101 (e.g., cloud computing service 103) by way of a network 106, such as the Internet or a private network.

In the description below, actions are ascribed to users, particularly consumers and providers. Such actions shall be understood to be performed concerning client device (or devices) 114 operated by such users. For example, a notification to a user may be understood to be a notification transmitted to client device 114, input or instruction from a user may be understood to be received by way of the client device 114, and interaction with an interface by a user shall be understood to be interaction with the interface on the client device 114. In addition, database operations (joining, aggregating, analysis, etc.) ascribed to a user (consumer or provider) shall be understood to include performing such actions by the cloud computing service 103 in response to an instruction from that user.

In some aspects, a data consumer 115 can communicate with the client device 114 to access functions offered by the data provider. Additionally, the data consumer can access functions (e.g., task modification based on dynamic SQL statement functionalities) offered by the network-based database system 102 via the network 106.

The compute service manager 108 is also coupled to one or more metadata databases 112 that store metadata about various functions and aspects associated with the network-based database system 102 and its users. For example, a metadata database 112 may include a summary of data stored in remote data storage systems as well as data available from a local cache. Additionally, a metadata database 112 may include information regarding how data is organized in remote data storage systems (e.g., the cloud storage platform 104) and the local caches. Information stored by a metadata database 112 allows systems and services to determine whether a piece of data needs to be accessed without loading or accessing the actual data from a storage device.

The metadata database 112 can include one or more pruning indexes. The compute service manager 108 may generate a pruning index for each source table accessed from the storage platform 104 and use a pruning index to prune the set of micro-partitions of a source table to scan for data in executing a query. That is, given a query directed at a source table organized into a set of micro-partitions, the computing service manager 108 can access a pruning index from the database 114 and use the pruning index to identify a reduced set of micro-partitions to scan in executing the query. The set of micro-partitions to scan in executing a query may be referred to herein as a "scan set."

In some embodiments, the compute service manager 108 may determine that a job should be performed based on data from the metadata database 112. In such embodiments, the compute service manager 108 may scan the data and determine that a job should be performed to improve data organization or database performance. For example, the compute service manager 108 may determine that a new version of a source table has been generated and the pruning index has not been refreshed to reflect the new version of the source table. The metadata database 112 may include a transactional change tracking stream indicating when the new version of the source table was generated and when the pruning index was last refreshed. Based on that transaction stream, the compute service manager 108 may determine that a job should be performed. In some embodiments, the compute service manager 108 determines that a job should be performed based on a trigger event and stores the job in a queue until the compute service manager 108 is ready to schedule and manage the execution of the job. In an embodiment of the disclosure, the compute service manager 108 determines whether a table or pruning index needs to be re-clustered based on one or more DML, commands being performed, wherein one or more of DML commands constitute the trigger event.

The compute service manager 108 is further coupled to the execution platform 110, which provides multiple computing resources (e.g., execution nodes) that execute, for example, various data storage, data retrieval, and data processing tasks. The execution platform 110 is coupled to storage platform 104 and cloud storage platforms 122. The storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid-state drives (SSDs), storage clusters, Amazon S3™ storage systems, or any other data-storage technology.

Additionally, the cloud storage platform 104 may include distributed file systems (such as Hadoop Distributed File Systems (HDFS)), object storage systems, and the like. In some embodiments, at least one internal stage 126 may reside on one or more of the data storage devices 120-1-120-N, and at least one external stage 124 may reside on one or more of the cloud storage platforms 122.

In some embodiments, communication links between elements of the computing environment 100 are implemented via one or more data communication networks, such as network 106. These data communication networks may utilize any communication protocol and any type of communication medium. In some embodiments, the data communication networks are a combination of two or more data communication networks (or sub-Networks) coupled with one another. In alternate embodiments, these communication links are implemented using any type of communication medium and any communication protocol.

The compute service manager 108, metadata database(s) 112, execution platform 110, and storage platform 104, are shown in FIG. 1 as individual discrete components. However, each of the compute service manager 108, metadata database(s) 112, execution platform 110, and storage platforms 104 and 122 may be implemented as a distributed system (e.g., distributed across multiple systems/platforms at multiple geographic locations). Additionally, each of the compute service manager 108, metadata database(s) 112, execution platform 110, and storage platforms 104 and 122 can be scaled up or down (independently of one another) depending on changes to the requests received and the changing needs of the network-based database system 102. Thus, in the described embodiments, the network-based database system 102 is dynamic and supports regular changes to meet the current data processing needs.

During typical operation, the network-based database system 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

As shown in FIG. 1, the cloud computing platform 101 of the computing environment 100 separates the execution platform 110 from the storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from, and store data to, any of the data storage resources in the cloud storage platform 104.

Figure 2:
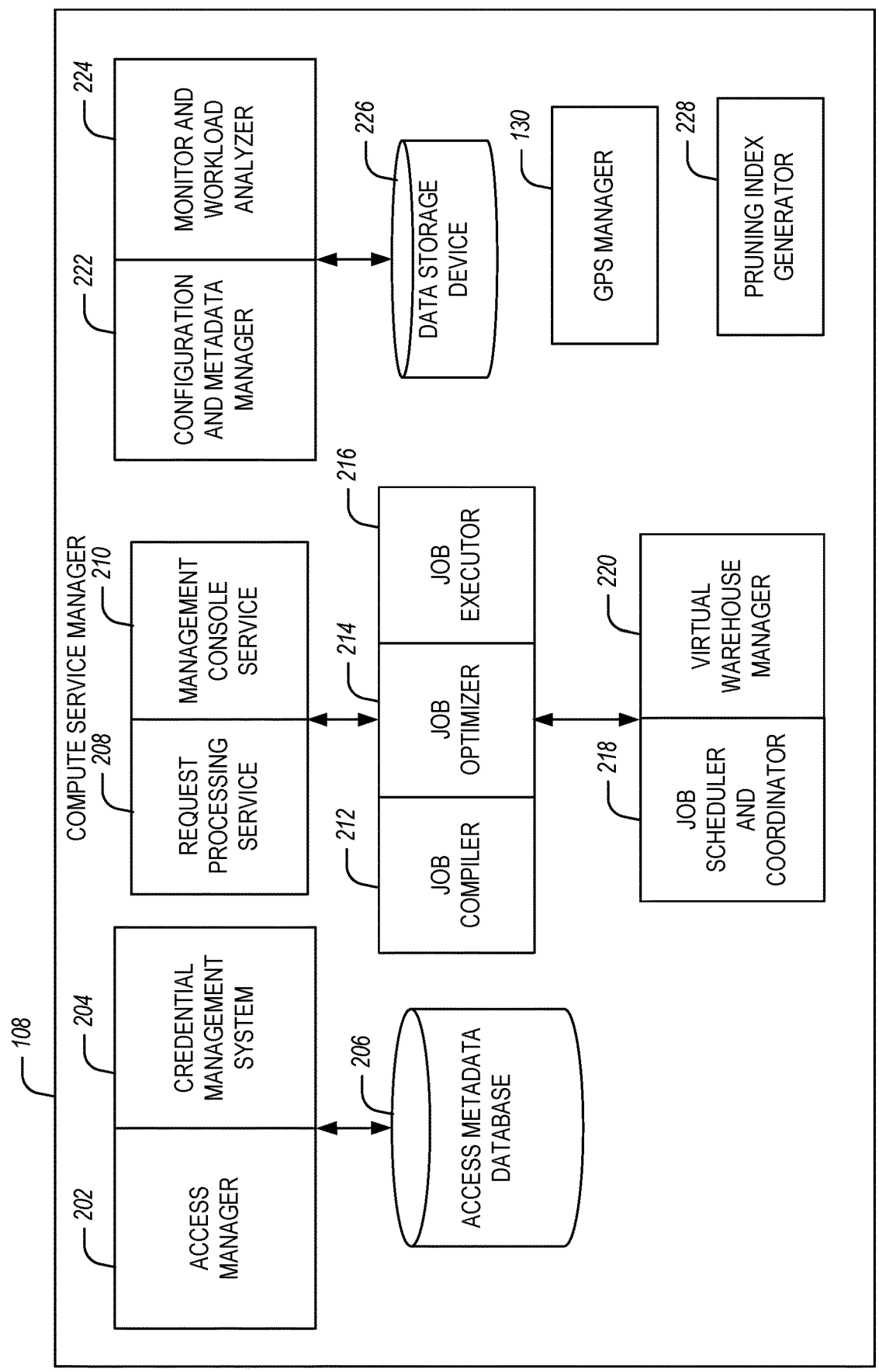
FIG. 2 is a block diagram illustrating the components of a compute service manager using a geospatial predicate search manager, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a credential management system 204 coupled to an access metadata database 206, which is an example of the metadata database(s) 112. Access manager 202 handles authentication and authorization tasks for the systems described herein. The credential management system 204 facilitates the use of remotely stored credentials (e.g., credentials stored in one of the remote credential stores) to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the access metadata database 206). A remote credential store definition identifies a remote credential store (e.g., one or more of the remote credential stores) and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. Job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries.

Additionally, the compute service manager 108 includes a configuration and metadata manager 222, which manages the information related to the data stored in the remote data storage devices and the local buffers (e.g., the buffers in the execution platform 110). The configuration and metadata manager 222 uses metadata to determine which data files need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based database system 102 and may further redistribute tasks based on a user (e.g., "external") query workload that may also be processed by the execution platform 110. The configuration and metadata manager 222 and the monitor and workload analyzer 224 are coupled to a data storage device 226. The data storage device 226 in FIG. 2 represents any data storage device within the network-based database system 102. For example, data storage device 226 may represent buffers in execution platform 110, storage devices in storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 302-1 may need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query and any other data is unusable, rendered so by destruction or encryption where the key is unavailable.

As shown, the compute service manager 108 further includes a pruning index generator 228. The pruning index generator 228 is responsible for generating pruning indexes to be used in pruning scan sets for queries directed to tables stored in the storage platform 104. Each pruning index comprises a set of filters (e.g., blocked bloom filters, bloom filters, hash filter, or cuckoo filters) that encode the existence of unique values in each column of a source table. The pruning index generator 228 generates a filter for each micro-partition of a source table and each filter indicates whether data matching a query is potentially stored on a particular micro-partition of the source table. Further details regarding the generation of pruning indexes are discussed below in connection with FIGS. 4-13.

In some embodiments, the compute service manager 108 further includes the GPS manager 130 which can configure and provide geospatial predicate search configuration functions, which are described in greater detail in connection with FIGS. 14-28.

Figure 3:
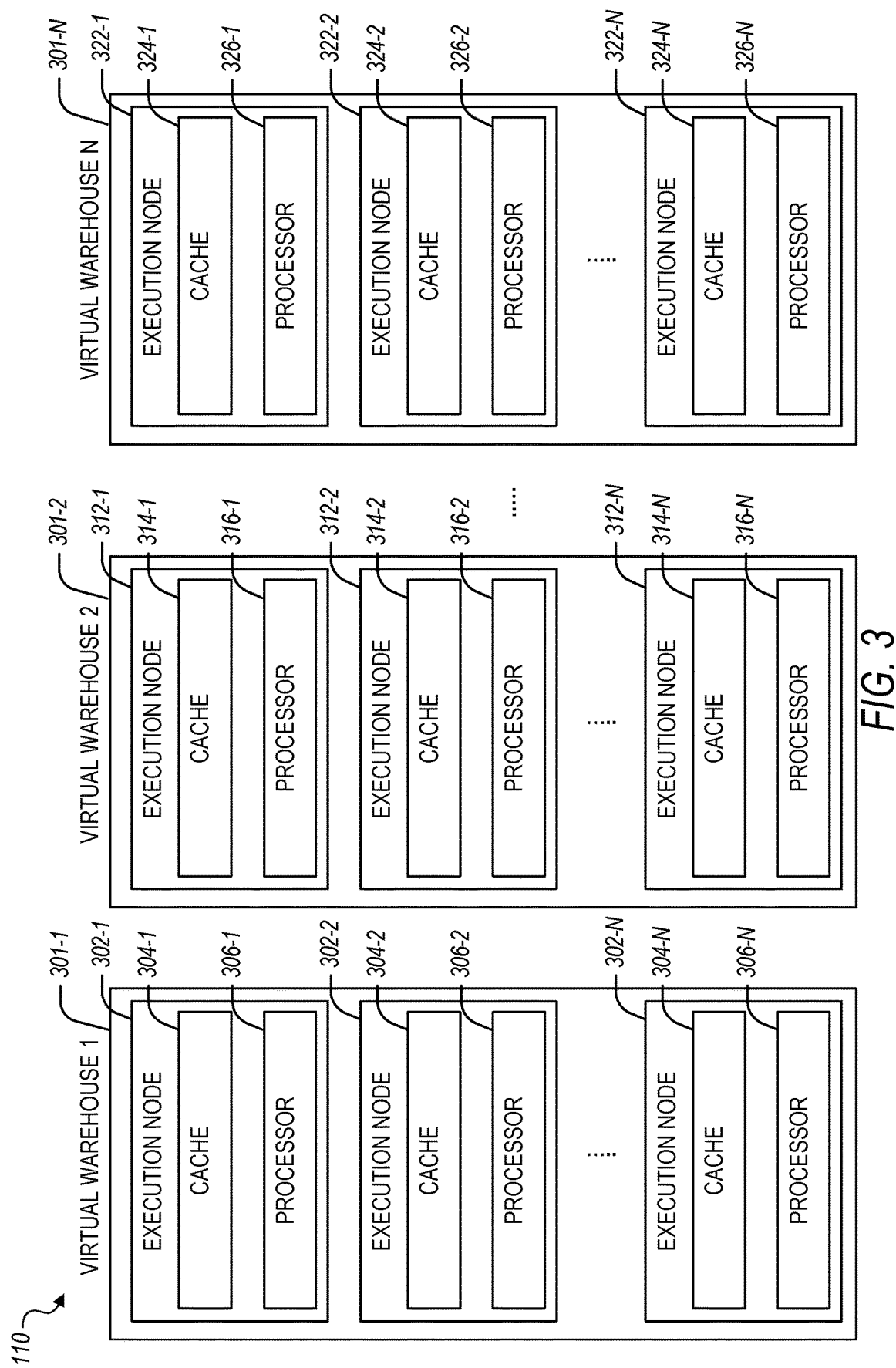
FIG. 3 is a block diagram illustrating components of an execution platform, in accordance with some embodiments of the present disclosure.

FIG. 3 is a block diagram illustrating components of the execution platform 110, in accordance with some embodiments of the present disclosure. As shown in FIG. 3, the execution platform 110 includes multiple virtual warehouses, including virtual warehouse 1 (or 301-1), virtual warehouse 2 (or 301-2), and virtual warehouse N (or 301-N). Each virtual warehouse includes multiple execution nodes that each include a data cache and a processor. The virtual warehouses can execute multiple tasks in parallel by using multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in the cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the cloud storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1.

Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data being cached by the execution nodes. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although each of the execution nodes shown in FIG. 3 includes one data cache and one processor, alternative embodiments may include execution nodes containing any number of processors and any number of caches. Additionally, the caches may vary in size among the different execution nodes. The caches shown in FIG. 3 store, in the local execution node, data that was retrieved from one or more data storage devices in the cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and N are associated with the same execution platform 110, virtual warehouses 1, . . . , N may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location, and execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault-tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in the cloud storage platform 104, but each virtual warehouse has its execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
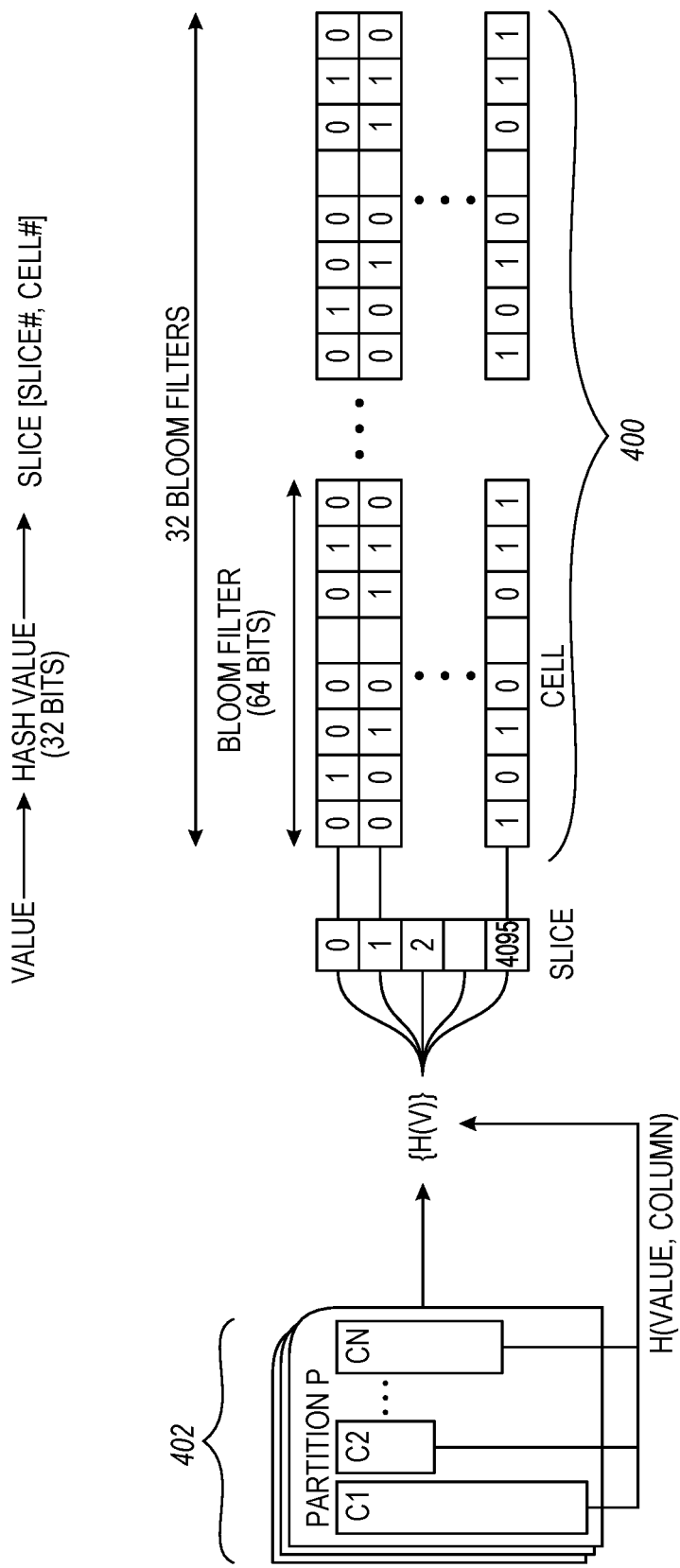
FIG. 4 is a conceptual diagram illustrating the generation of a blocked bloom filter, which may form part of a pruning index generated by the network-based data warehouse system based on a source table, in accordance with some example embodiments.

FIG. 4 is a conceptual diagram illustrating the generation of a filter 400, which forms part of a pruning index generated by the network-based data warehouse system 102 based on a source table 402, in accordance with some example embodiments. As shown, the source table 402 is organized into multiple micro-partitions and each micro-partition comprises multiple columns in which values are stored.

In generating a pruning index, the compute service manager 108 generates a filter for each micro-partition of the source table 402, an example of which is illustrated in FIG. 4 as blocked bloom filter 400. Blocked bloom filter 400 comprises multiple bloom filters and encodes the existence of distinct values in each column of the corresponding micro-partition. When a query comprising an equality predicate is received, rather than scanning the entire source table 402 to evaluate the equality predicate, the network-based data warehouse system 102 probes the pruning index to identify a reduced scan set of micro-partitions comprising only a sub-set of the micro-partitions of the source table 402.

As shown, the blocked bloom filter 400 is decomposed into N bloom filters stored as individual columns of the pruning index to leverage columnar scans. In generating the blocked bloom filter 400 for a particular micro-partition of the source table 402, stored values are transformed into bit positions in the bloom filters. For example, a set of hash values may be generated from stored values in each column of the micro-partition and the set of hash values may be used to set bits in the bloom filters.

The number of distinct values over all the columns in a micro-partition is bounded by the maximum size of the micro-partition. As an example, in the worst case, for a 16 MB partition, the sum of the number of distinct values for all columns is at most 4 million (16 MB/4 bytes). Accordingly, to make access to the pruning index as efficient as possible, each bloom filter 400 is sliced into a fixed number of chunks on the domain of the hash values (e.g., based on the number of distinct values per partition), and each bloom filter 400 is further decomposed in a fixed number of M-bit (e.g., 64 bit) values. Each line of the blocked bloom filter 400 is encoded and stored as a single row in the pruning index. Each bloom filter 400 is represented in the pruning index as a two-dimensional array indexed by the hash values of the stored column values.

FIG. 5 illustrates a portion of an example pruning index 500, in accordance with some embodiments of the present disclosure. The pruning index 500 is organized into a plurality of rows and columns. The columns of the pruning index 500 comprise a partition number 502, a slice number 504 that provides an encoding of the domain of hash values, a summary type 506, a hash number 508, and a blocked bloom filter 510 (e.g., the blocked bloom filter 400) that is decomposed into N numeric columns, each column in the blocked bloom filter 510 represents a bloom filter.

Within each row, a micro-partition number or other identifier is included in the partition number 502, a slice number is included in the slice number 504 column, an indicator of a summary type is stored in the summary type 506 column, and a number corresponding to the number of hash functions used to build the bloom filters is stored in the hash number 508 column. Each slice number 504 in the slice number column comprises a combination of level and block number. The level indicates the number of slices of the bloom filter 510 and the block number indicates the position of the slice in a specific bloom filter 510 (e.g., in the bloom filter column). The number of hash functions may be tuned to control the false positive rate of the pruning index 500.

The cost in terms of computational resources of accessing a pruning index is mostly bounded by the size of the index, and thus it is beneficial to minimize the total size of the pruning index. To this end, the compute service manager 108 can reduce the number of slices computed per micro-partition. The first level of partitioning of the pruning index is performed to represent the domain of hash values. At one extreme, a bloom filter can cover the complete domain of hash values (where the bloom filter comprises a single slice) and at the other extreme, a bloom filter can be split into an arbitrary maximum of slices (4096 for example). This decision is parameterized by the number of distinct values in the source table because a single slice of the pruning index can only represent a limited number of distinct values.

The number of distinct values significantly impacts the cost of clustering because it controls the number of rows generated for a given micro-partition. For example, a micro-partition with a small number of distinct values (e.g., 3) would have a single slice, while a micro-partition with a large number of distinct values (e.g., 1 million) may have the maximum number of slices. In general, the maximum number of distinct values determines the maximum number of slices to encode. Accordingly, in some embodiments, the compute service manager 108 uses a first portion of the hash value (e.g., the 16 higher bits) for the level and a second portion of the hash value (e.g., the 16 lower bits) for addressing.

Figure 6:
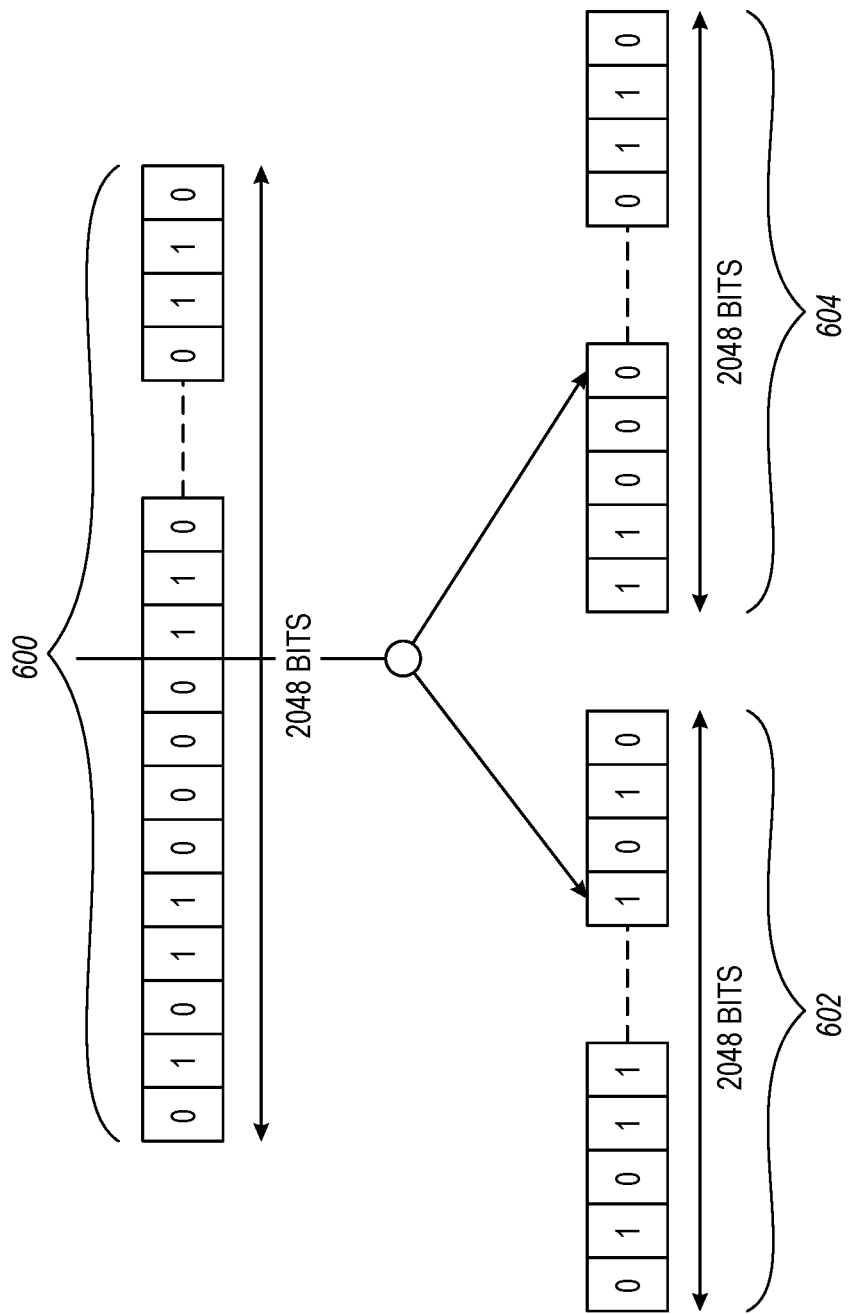
FIG. 6 illustrates a single bloom filter of a pruning index, in accordance with some embodiments of the present disclosure.

To this end, blocks within the pruning index 500 are organized in a hierarchy that encodes the level of decomposition of the domain of values. As an example of the foregoing, FIG. 6 illustrates a single bloom filter 600 of a pruning index. In the example illustrated in FIG. 6, bloom filter 600 is 2048 bytes and can represent 64 distinct values with a false positive rate of 1/1,000,0000. If the corresponding micro-partition of the source table contains more than 64 distinct values, the false positive rate would degrade as soon as the density of the bloom filter is larger than ½ (e.g., more bits are set than bits are unset). To address this issue, the compute service manager 108 can, in some embodiments, build two bloom filters (bloom filters 602 and 604), with one bloom filter for each half of the domain.

Each of the bloom filters 602 and 604 will be represented by two rows in the pruning index, identified by their level and slice number. Consistent with some embodiments, a particular value and its corresponding hash value maps to a single one of the blocks across all micro-partitions of the source table. Regardless of the level, a bit encodes a fixed subset of the domain.

Each slice number comprises a combination of a level number and a block number. The level and block number may, in some embodiments, be represented as two distinct columns, while in other embodiments, a linearization process is used in clustering to combine these values to form the slice number.

In some embodiments, the number of hash functions to compute per bloom filter can be varied to improve performance. This optimization can reduce the CPU cost of building the pruning index while maintaining a target false positive rate for extremely large tables. Accordingly, in some embodiments, a user may specify a target false positive rate and the compute service manager 108 may determine the number of hash functions to compute per bloom filter as well as the level based on the target false positive rate.

Figure 7:
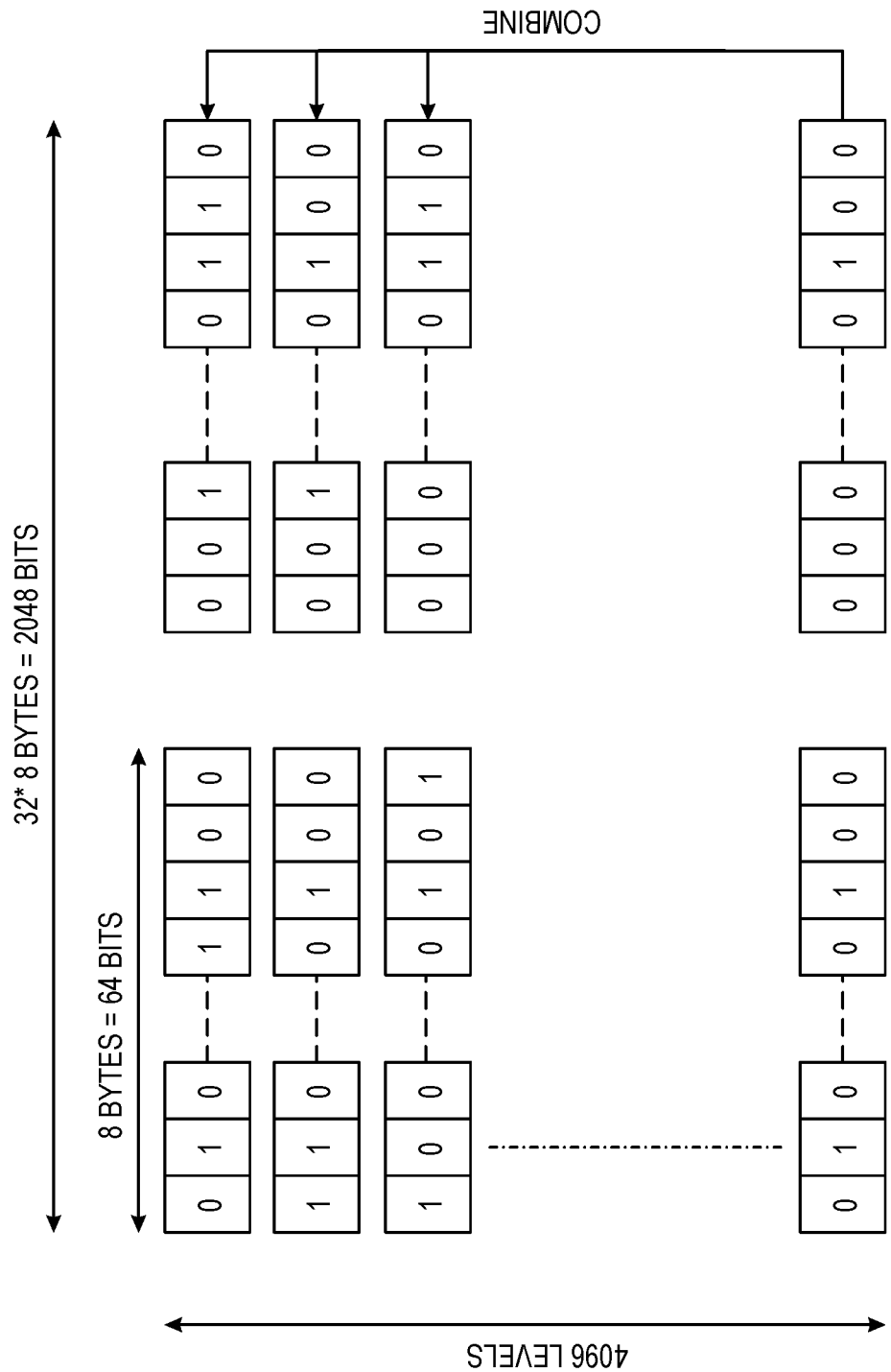
FIG. 7 is a conceptual diagram illustrating further details regarding the creation of a pruning index, in accordance with some embodiments.

FIG. 7 is a conceptual diagram illustrating further details regarding the creation of a pruning index, in accordance with some embodiments. The creation of a filter (e.g., a blocked bloom filter) is performed by a specialized operator within the compute service manager 108 that computes the set of rows of the pruning index. This operator obtains all the columns of a particular micro-partition of a source table and populates the filter for that micro-partition.

If the total number of distinct values in the source table is unknown, the compute service manager 108 allocates the maximum number of levels to the pruning index, populates each filter, and then applies a consolidation phase to merge the different filters in a final representation of the pruning index. The memory allocated to compute this information per micro-partition is constant. In the example illustrated in FIG. 7, the memory allocated to compute this information is a two-dimensional array of 64-bit unsigned integers. The first dimension is indexed by the level (maximum number of levels) and the second dimension is indexed by the number of bloom filters (e.g., 32). Since each partition is processed by a single thread, the total memory is bounded by the number of threads (e.g., 8) and the maximum level of levels.

The following snippet of pseudocode represents an example algorithm that may be performed by the compute service manager 108 in generating a pruning index, consistent with some embodiments.

```
If it is a new partition:
    Merge all the filters
For each column, do:
    Compute a 32-bits hash value H for each value of the column
    Compute the level L by using the 16 high bits, L = H >> 16
    Compute the filter at position P = H & (32−1)
    If the bloom filter does not contain the value,
        increment the number of distinct values
```

As shown in FIG. 7, at each partition boundary, the compute service manager 108 combines blocks based on a target bloom filter density. For example, the compute service manager 108 may combine blocks such that the bloom filter density is no more than half. Since the domain of hashed values is uniform, this can be done incrementally or globally based on the observed number of distinct values computed above.

If the number of distinct values is known, the compute service manager 108 determines the number of levels for the pruning index by dividing the maximum number of distinct values by the number of distinct values per level. To combine two levels, the compute service manager 108 performs a logical OR on all the integers representing the filter.

For performance reasons, the filter functions (create and check) combine two hash functions (e.g., two 32-bit hash functions). Both the hash function computation and the filter derivation needs to be identical on both the execution platform 110 and compute service manager 108 to allow for pruning in compute service manager 108 and in the scan set initialization in the execution platform 110.

Figure 8:
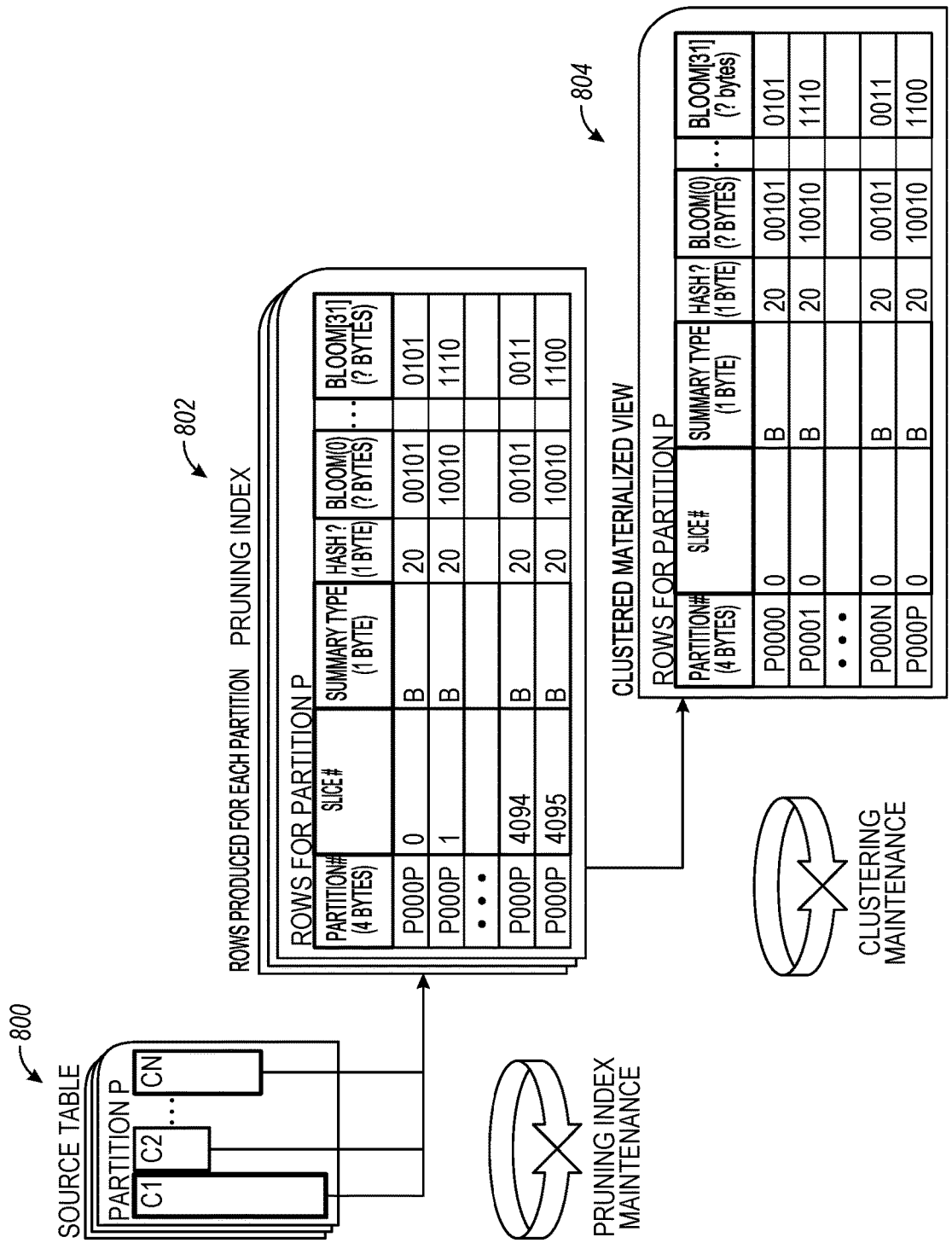
FIG. 8 is a conceptual diagram illustrating the maintenance of a pruning index, in accordance with some embodiments.
Figure 9:
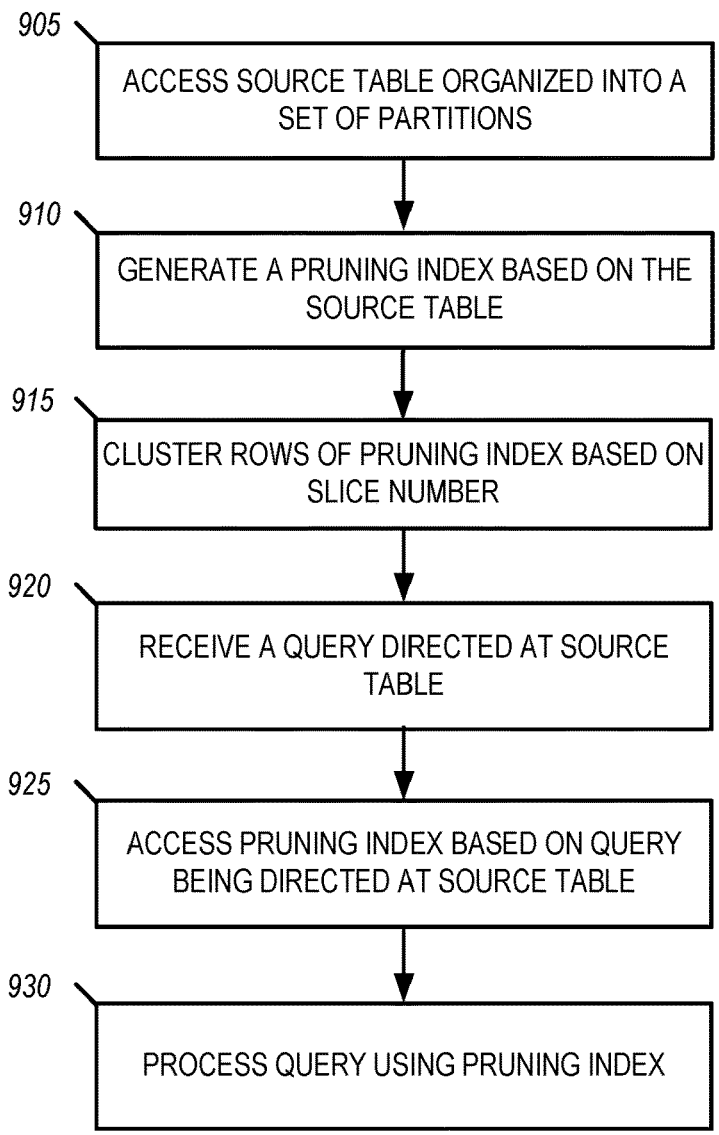
FIGS. 9-13 are flow diagrams illustrating operations of the network-based data warehouse system in performing a method for generating and using a pruning index in processing a database query, in accordance with some embodiments of the present disclosure.

FIG. 8 is a conceptual diagram illustrating the maintenance of a pruning index based on changes to a source table, in accordance with some embodiments. As shown, at 800, a change is made to a source table (e.g., the addition of one or more rows or columns). The change to the source table triggers the generation of additional rows in the pruning index for each changed or new micro-partition of the source table, at 802. At a regular interval, the newly produced rows in the pruning index are re-clustered on the slice number, at 804.

The compute service manager 108 uses a deterministic selection algorithm as part of clustering the prune index. The processing of each micro-partition in the source table creates a bounded (and mostly constant) number of rows based on the number of distinct values in the source micro-partition. By construction, those rows are known to be unique, and the index domain is non-overlapping for that partition and fully overlapping with already clustered index rows. To minimize the cost of clustering, the compute service manager 108 delays re-clustering of rows until a threshold number of rows have been produced to create constant partitions.

Although the pruning index is described in some embodiments as being implemented specifically with blocked bloom filters, it shall be appreciated that the pruning index is not limited to blocked bloom filters, and in other embodiments, the pruning index may be implemented using other filters such as bloom filters, hash filters, or cuckoo filters.

FIGS. 9-13 are flow diagrams illustrating operations of the network-based data warehouse system 102 in performing a method 900 for generating and using a pruning index in processing a database query, in accordance with some embodiments of the present disclosure. The method 900 may be embodied in computer-readable instructions for execution by one or more hardware components (e.g., one or more processors) such that the operations of the method 900 may be performed by components of network-based data warehouse system 102.

Accordingly, the method 900 is described below, by way of example with reference thereto. However, it shall be appreciated that the method 900 may be deployed on various other hardware configurations and is not intended to be limited to deployment within the network-based data warehouse system 102.

Depending on the embodiment, an operation of the method 900 may be repeated in different ways or involve intervening operations not shown. Though the operations of the method 900 may be depicted and described in a certain order, the order in which the operations are performed may vary among embodiments, including performing certain operations in parallel or performing sets of operations in separate processes. For example, although the use and generation of the pruning index are described and illustrated together as part of the method 900, it shall be appreciated that the use and generation of the pruning index may be performed as separate processes, consistent with some embodiments.

At operation 905, the compute service manager 108 accesses a source table that is organized into a plurality of micro-partitions. The source table comprises a plurality of cells organized into rows and columns and a data value is included in each cell.

At operation 910, the compute service manager 108 generates a pruning index based on the source table. The pruning index comprises a set of filters (e.g., a set of blocked bloom filters) that index distinct values in each column of each micro-partition of the source table. A filter is generated for each micro-partition in the source table and each filter is decomposed into N numeric columns (e.g., 32 numeric columns) to enable integer comparisons. Consistent with some embodiments, the pruning index comprises a plurality of rows and each row comprises a micro-partition identifier, a slice number, and a set of bloom filters.

At operation 915, the compute service manager 108 clusters rows of the pruning index based on slice numbers. In clustering rows based on slice numbers, the compute service manager 108 groups together rows that have the same slice number and sorts the row groups in order based on the corresponding slice number.

At operation 920, the compute service manager 108 receives a query directed at the source table. The query can comprise an equality predicate.

At operation 925, the compute service manager 108 accesses the pruning index associated with the source table based on the query being directed at the source table. For example, database 112 may store information describing associations between tables and pruning indexes.

At operation 930, the compute service manager 108 works in conjunction with the execution platform 110 to process the query using the pruning index. In processing the query, the compute service manager 108 and/or the execution platform 110 may use the pruning index to prune the set of micro-partitions of the search table to be scanned for data that matches the query (e.g., a data value that satisfies the equality predicate). That is, the pruning index may be used to identify a reduced scan set comprising only a sub-set of the micro-partitions of the source table. The compute service manager 108 uses the pruning index to identify one or more micro-partitions in which data that satisfies the equality predicate is potentially stored. In processing the query, the execution platform 110 scans the sub-set of micro-partitions of the reduced scan set while foregoing a scan of the remaining micro-partitions.

Figure 10:
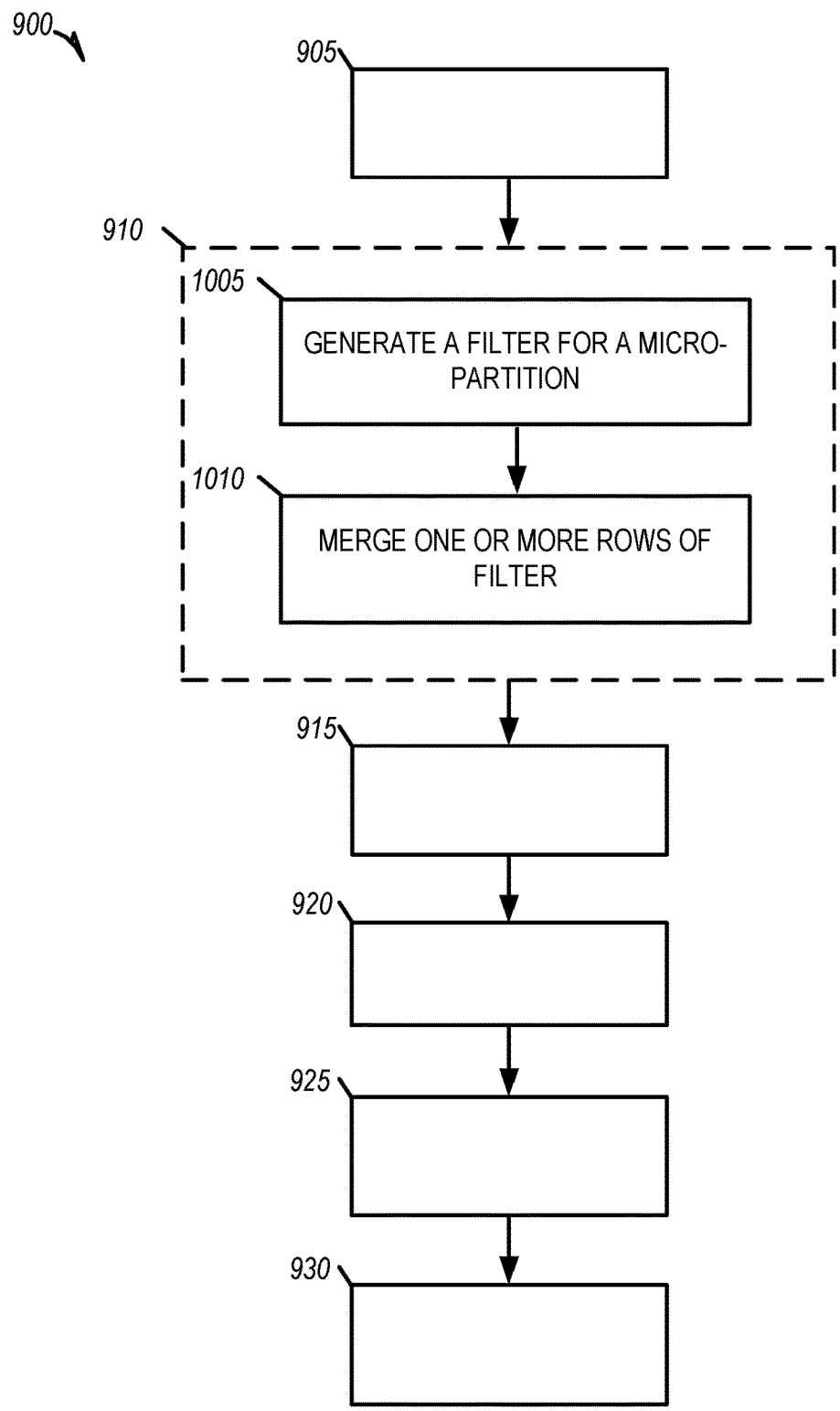

As shown in FIG. 10, the method 900 may, in some embodiments, further include operations 1005 and 1010. Consistent with these embodiments, operations 1005 and 1010 may be performed as part of operation 910 where the compute service manager 108 generates the pruning index. The operations 1005 and 1010 are described below in reference to a single micro-partition of the source table simply for ease of explanation. However, it shall be appreciated, that in generating the pruning index, the compute service manager 108 generates a filter for each micro-partitions of the source table, and thus, the operations 1005 and 1010 may be performed for each micro-partition of the source table.

At operation 1005, the compute service manager 108 generates a filter for a micro-partition of the source table. For example, the compute service manager 108 may generate a blocked bloom filter for the micro-partition that indexes distinct values in each column of the micro-partition of the source table. Further details regarding the generation of the filter for the micro-partition are discussed below in reference to FIG. 11.

At operation 1010, which is optional in some embodiments, the compute service manager 108 merges one or more rows of the filter. The compute service manager 122 can merge rows by performing a logical OR operation. The compute service manager 108 may merge rows of the filter until a density threshold is reached, where the density refers to the ratio of 1's and 0's in a row. The density threshold may be based on a target false positive rate.

Figure 11:
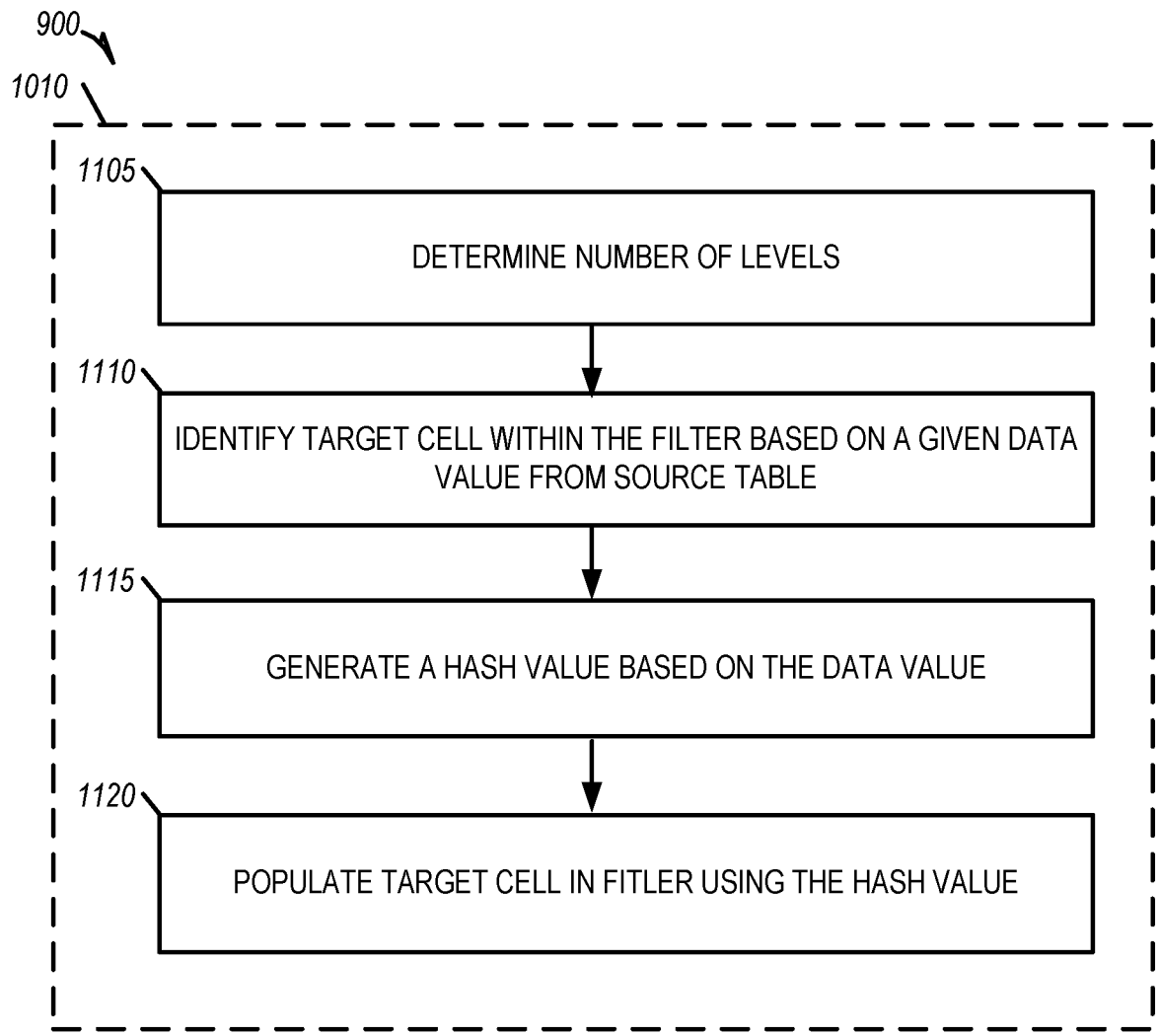

As shown in FIG. 11, the operation 1005, may, in some embodiments, include operations 1105, 1110, 1115, and 1120. At operation 1105, the compute service manager 108 computes a number of levels for the filter corresponding to the micro-partition of the source table. If the number of distinct values in the micro-partition of the source table is unknown, the compute service manager 108 determines the number of levels based on a maximum number of possible distinct values. If the number of distinct values in the micro-partition of the source table is known, the compute service manager 108 determines the number of levels based on the number of distinct values.

At operation 1110, the compute service manager 108 identifies a target cell within the filter based on a given data value included in a column of a micro-partition of the source table. To identify the target cell, the compute service manager 108 identifies a slice and a filter column in the filter. The compute service manager 108 identifies the slice based on the data value and the number of levels in the pruning index. The compute service manager 108 identifies the filter column based on the data value and the number of filter columns in the blocked bloom filter.

At operation 1115, the compute service manager 108 generates a hash value based on the data value from the source table. In generating the hash value, the compute service manager 108 may apply one or more hash functions to the data value. At operation 11120, the compute service manager 108 populates the target cell in the blocked bloom filter using the hash value.

For ease of explanation, operations 1110, 1115, and 1120 are described above in reference to a single data value in a single micro-partition of the source table. However, it shall be understood that in generating a filter for a micro-partition of the source table, the operation 1110, 1115, and 1120 are repeated for each data value of each column of the micro-partition in the source table.

Figure 12:
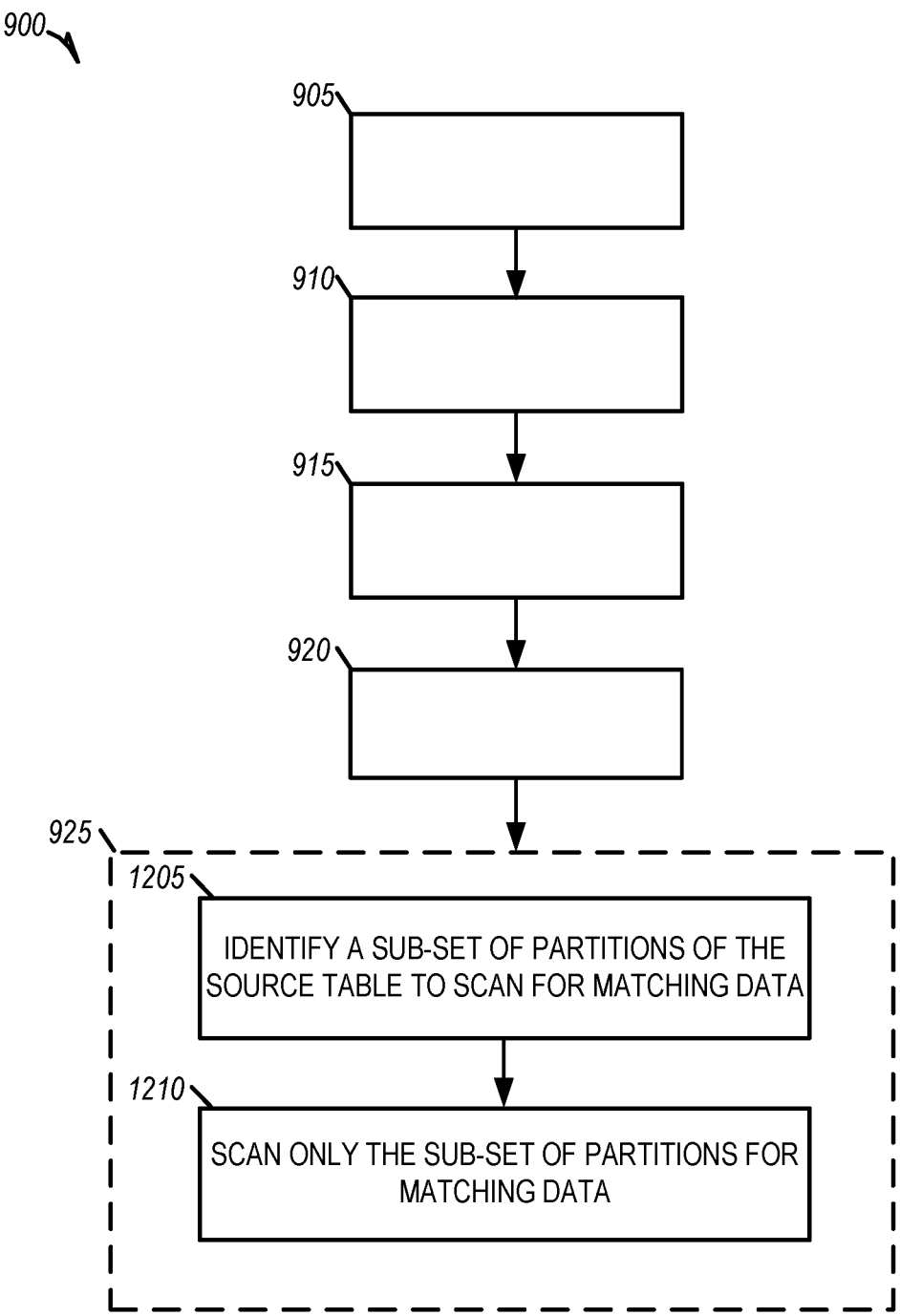

As shown in FIG. 12, the method 900 may, in some embodiments, include operations 1205 and 1210. Consistent with these embodiments, operations 1205 and 1210 may be performed as part of operation 925 where the compute service manager 108 works in conjunction with the execution platform 110 to process the query using the pruning index.

At operation 1205, the compute service manager 108 identifies a reduced scan set comprising a sub-set of micro-partitions of the source table to scan for data that satisfies the equality predicate in the query. The sub-set of micro-partitions of the source table includes micro-partitions determined to potentially include the matching data based on the set of blocked bloom filters in the pruning index. The compute service manager 108 may identify the sub-set of micro-partitions by generating a hash value based on the equality predicate and identifying one or more values in the pruning index that match the hash value. The compute service manager 108 identifies one or more micro-partitions that potentially store data that satisfies the equality predicate based on the one or more values in the pruning index that match the hash value. That is, a value in the pruning index matching the hash value indicates that matching data is potentially stored in a micro-partition that can be identified based on the slice number and filter column corresponding to the cell of the pruning index in which the value is stored.

The compute service manager 108 communicates the sub-set of micro-partitions to the execution platform 110, and the execution platform 110 scans only the sub-set of micro-partitions of the source table in the reduced scan set to locate data that satisfies the equality predicate. In this way, the execution platform 110 searches only micro-partitions where matching data is potentially stored while foregoing an expenditure of additional time and resources to also search the remaining micro-partitions for which it is known, based on the pruning index, that matching data is not stored.

Consistent with some embodiments, rather than providing a reduced scan set with micro-partitions of the source table to scan for data, the compute service manager 108 may instead identify and compile a set of non-matching micro-partitions. The compute service manager 108 or the execution platform 110 may remove micro-partitions from the scan set based on the set of non-matching micro-partitions.

Figure 13:
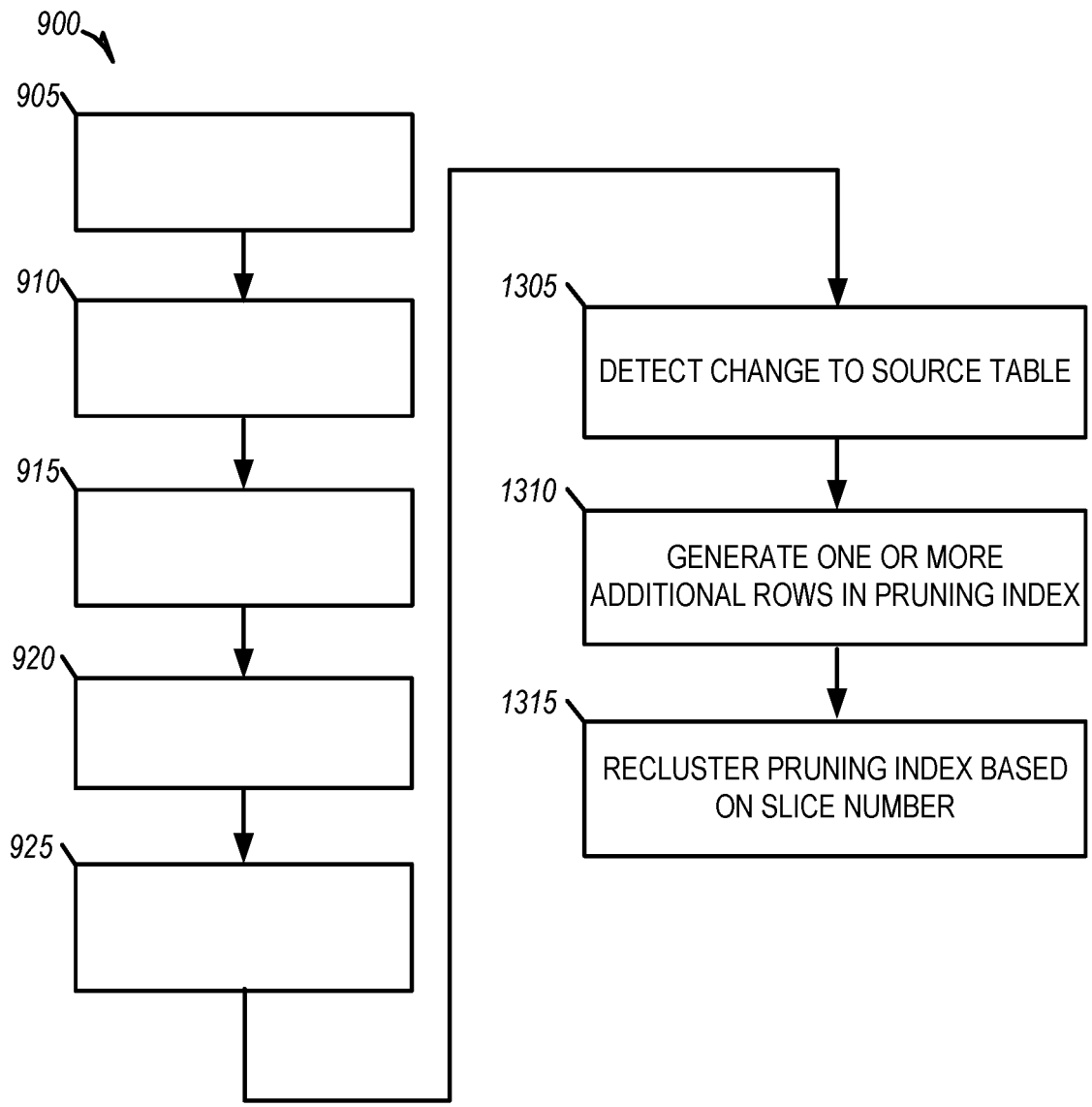

As shown in FIG. 13, the method 900 may, in some embodiments, include operations 1305, 1310, and 1315. Although the operations 1305, 1310, and 1315 are illustrated as being performed after operation 925, it shall be appreciated that the operations 1305, 1310, and 1315 may be performed at any time after operation 910 where compute service manager 108 generates the pruning index.

At operation 1305, the compute service manager 108 detects a change to the source table. The change to the source table may include one or more rows being added to and/or deleted from the source table.

At operation 1310, the compute service manager 108 generates one or more additional rows in the pruning index associated with the source table based on the change to the source table. The compute service manager 108 generates additional rows in the same manner in which rows of the pruning index are generated during the initial creation of the pruning index.

At operation 1315, the compute service manager 108 re-clusters the pruning index based on slice number. Consistent with some embodiments, the compute service manager 108 may wait to re-cluster the pruning index until a threshold number of additional rows have been added to the pruning index.

FIGS. 14-28 describe aspects of configuring an indexed geospatial predicate search in connection with functionalities which can be performed by the task configuration performed by the GPS manager 130.

In some aspects, the GPS manager 130 is configured to provide search optimization support for geography predicates by approximating geography objects (e.g., points, lines, polygons, etc.) as a set of cells in a hierarchical grid representation of the Earth in a spatial indexing scheme such as S2.

The S2 hierarchy has 31 levels, where cells at level 0 are the largest, and cells at level 30 are the smallest. Each level is a subdivision of the higher (lowered number) level.

The set of cells representing an object is known as a covering of the object and can include cells from different levels of the hierarchy (see S2 covering). When computing a covering, we choose a subset of levels to which cells can belong. For example, a polygon can be represented by cells at levels 4,7,10,13 only. In some aspects, an approximate determination can be made if two geography objects (e.g., as configured in a geospatial predicate) satisfy some relation by comparing their coverings. In some embodiments, the representation of the objects can be extended by including, for each cell in the covering, its parents at higher levels in the hierarchical grid. In the above-mentioned example, the parents of a cell at level 13 are those that include the cell at levels 10, 7, and 4, while the parent of a cell at level 7 is the one that includes it at level 4.

In some aspects, the GPS manager 130 is configured to use the extended covering with parent cells to determine, for example, if two geographies G1 and G2 intersect by noting that if G1 intersects G2, then their extended coverings must intersect at least one pair of cells where one of the cells is not a parent cell. In other words, at least one cell in the covering of G1 must be in the extended covering of G2 (either be a cell of the covering or a parent), or a parent of a cell in the covering of G1 must be in the covering of G2. Conversely, if this condition is not satisfied, then G1 and G2 cannot intersect.

The above property can be used to configure and process queries geospatial predicates, such as the predicate ST_INTERSECTS (G1, G2). In some aspects, the GPS manager 130 is configured to distinguish between covering cells and parent cells when comparing geographies (in general, if two geometries share a parent cell but have non-overlapping coverings, then they are not related).

In some embodiments, the GPS manager performs search optimization for geography predicates by leveraging the Bloom filter index implementation of a search index (e.g., a pruning index). For a geography column that is added to the index, the GPS manager 130 computes the extended covering of each value and adds the cells to the search index by computing a hash function on the cell ID and adding the result to the Bloom filter of the search index. In some aspects, the GPS manager 130 uses different seeds when computing the hash functions for cells that are part of the original covering and for parent cells. This allows the GPS manager 130 to distinguish between the two kinds of cells when verifying the conditions for geospatial predicates.

In some aspects, to evaluate a geospatial predicate between a geography column (also referred to as a geography data column) and a constant geography object, the GPS manager 130 computes the extended covering of the constant and performs a lookup/search of the cells of the constant in the index (e.g., by calculating a hashing function of the cells of the constant and searching for hashing functions associated with cells of the geography data column) to check if the conditions of the geospatial predicate are satisfied for a partition. Partitions that do not satisfy the conditions can be pruned out.

In some aspects, the GPS manager 130 can configure a search index to support geography data type and geospatial predicates, which can be used in connection with search optimization for the queries on the geometry data type. In some aspects, the GPS manager is configured to perform search optimization for geography data types as well as for planar geometry data.

Figure 14:
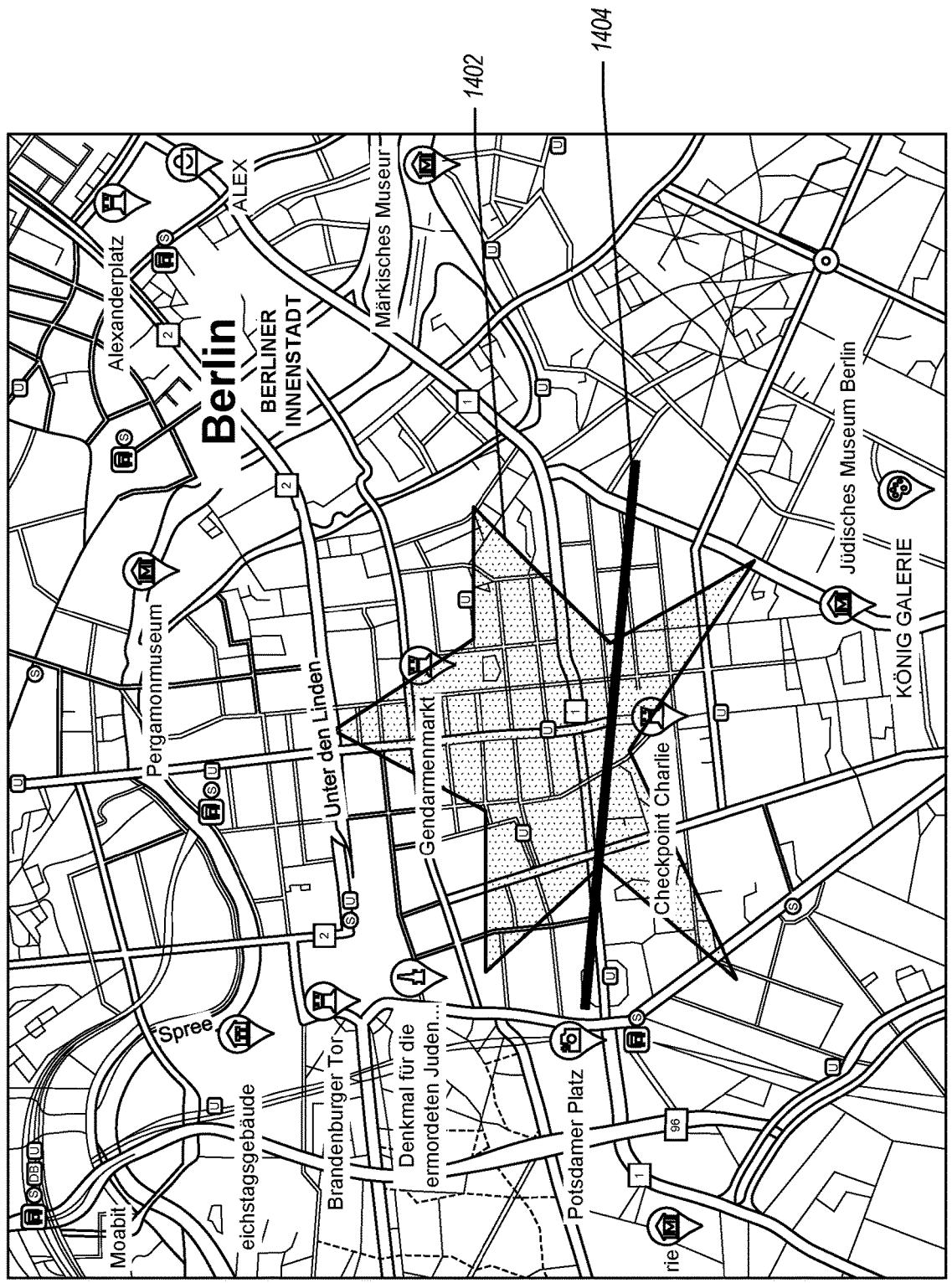
FIG. 14 is a block diagram of geospatial objects that are spatially related, in accordance with some embodiments of the present disclosure.

Unlike numeric types and strings, equality and similarity predicates may not be considered in connection with geography data columns. Instead, the spatial relation of the objects can be considered. For example, two different objects may still be spatially related, i.e., share the same part of space, as illustrated in FIG. 14. FIG. 14 is a block diagram 1400 of geospatial objects (e.g., a line 1404 and a polygon 1402) that are spatially related, in accordance with some embodiments of the present disclosure.

In some aspects, the GPS manager 130 can determine the spatial relation of objects by using a space dividing spatial index like Quadtree, K-d tree, or R-tree. Another approach to using spatial indexing is to divide the space into a set of uniquely identifiable hierarchical grid cells (or tiles). Each cell receives a unique integer or string identifier (e.g., a cell ID) and thus can be indexed using one or more hashing techniques. This approach can be used for spherical geometry (geography) where coordinates are bound and thus a stable grid can be defined. Example spatial indexing schemes which can be used include Geohash, S2, and H3.

Figure 15:
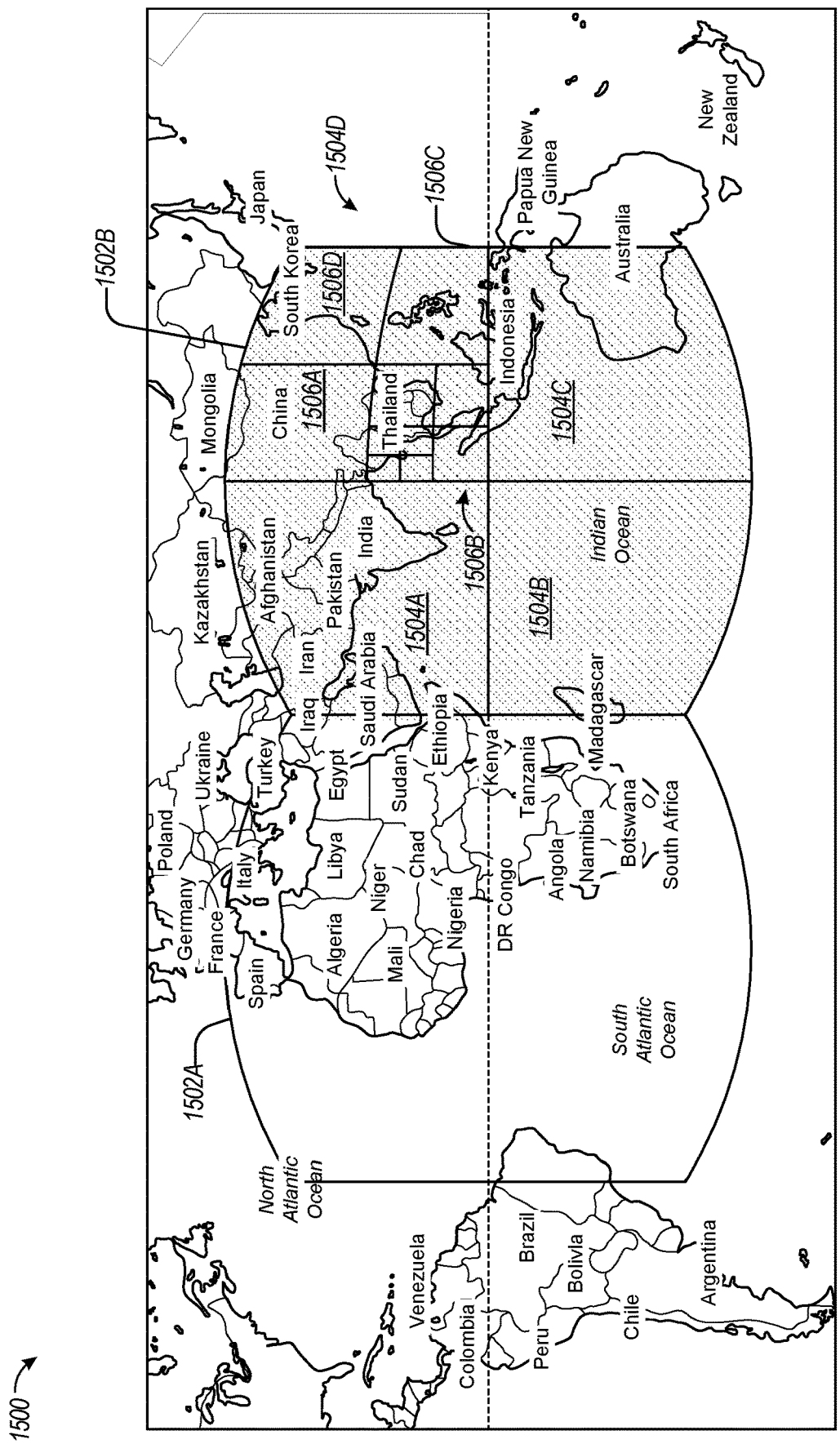
FIG. 15 is a block diagram of a hierarchical grid of cells according to the S2 spatial indexing scheme which can be used in connection with embodiments of the present disclosure.

FIG. 15 is a block diagram of a hierarchical grid 1500 of cells according to the S2 spatial indexing scheme which can be used in connection with embodiments of the present disclosure. Referring to FIG. 15, grid 1500 includes example S2 cells at different levels. The GPS manager 130 can use S2 cells in the techniques discussed herein.

The S2 cells hierarchy consists of 30 levels. Each cell has 4 children. The smallest cells at level 30 are called leaf cells, and there are $6*4^{30}$ leaf cells in total, each about 1 cm across the Earth's surface.

Referring to FIG. 15, grid 1500 includes cells 1502A and 1502B at the first level. Cell 1502B has 4 children as cells 1504A, 1504B, 1504C, and 1504D, with each of those having 4 children of their own. For example, cell 1504D has 4 children as cells 1506A, 1506B, 1506C, and 1506D. Similar cell dependency is used for all 30 levels of the S2 cell hierarchy.

In some embodiments, the GPS manager 130 configures indexed geospatial predicate search based on approximating a geometry by a set of S2 cells, adding each cell identifier (e.g., Int64 type identifier) to the partition filter (e.g., adding a hash function calculated based on the cell ID), and during the lookup, represent a query geometry with S2 cells and look for partitions that contain the cells IDs.

Determination of a Covering

In some embodiments, the GPS manager 130 is configured to represent any geometry with a set of S2 cells. The GPS manager 130 can select a pre-defined number (e.g., a threshold number) of S2 levels to use in connection with the disclosed techniques. For example, a subset of S2 levels that can be used for indexing (e.g., based on a threshold number of 4) includes S2 levels L1-L4 where L1<L2<L3<L4 (a smaller level means bigger cells and vice versa).

The GPS manager 130 further configures a maximum number of cells Cmax allowed in the representation of a geometry. The GPS manager 130 further determines a covering of geometry with at most Cmax cells on levels L1, . . . , L4.

Figure 16:
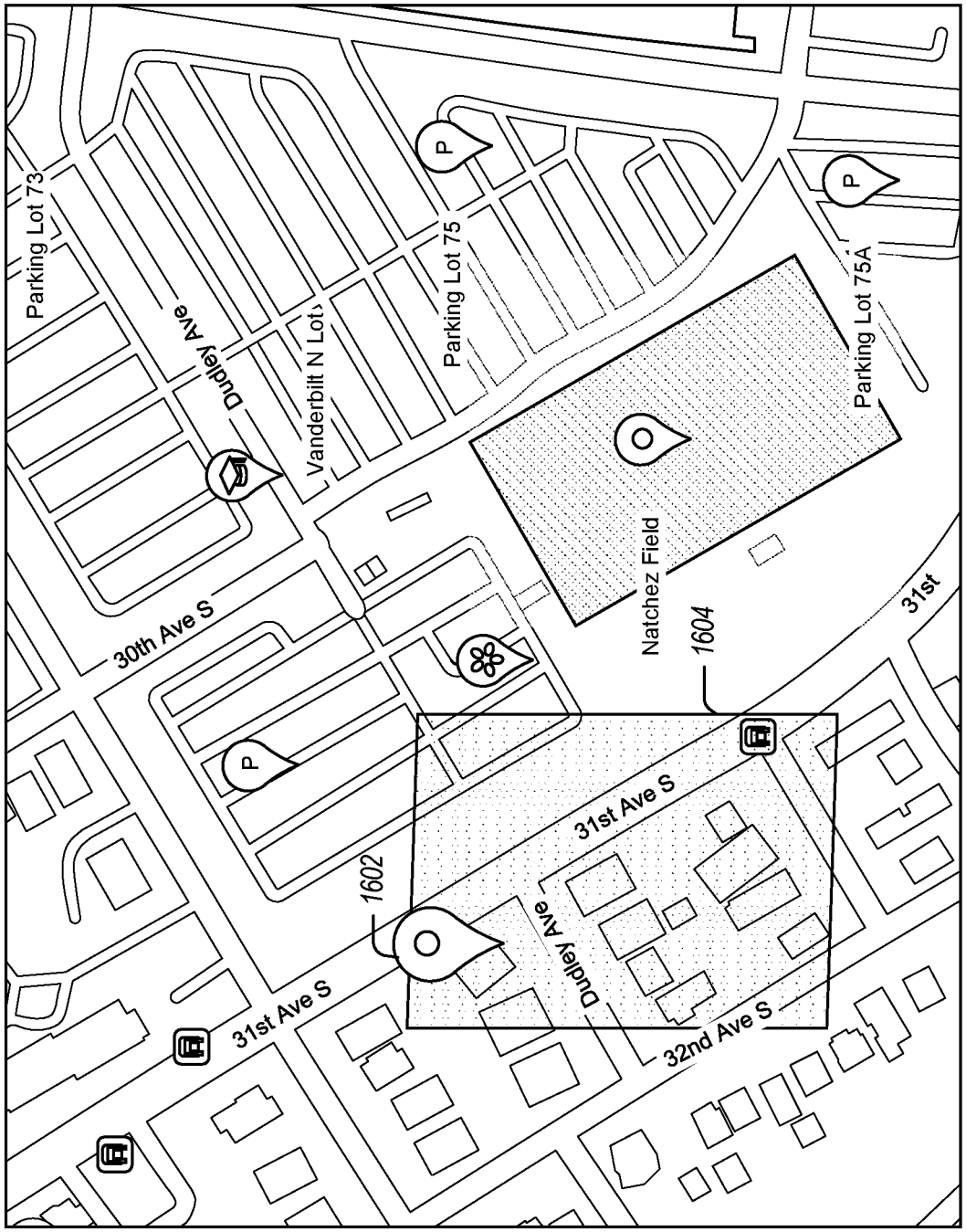
FIG. 16 is a diagram of a geospatial object and a covering cell from the S2 spatial indexing scheme, in accordance with some embodiments of the present disclosure.

FIG. 16 is a diagram 1600 of a geospatial object 1602 (e.g., a point) and a covering cell 1604 from the S2 spatial indexing scheme, in accordance with some embodiments of the present disclosure.

In some aspects, S2 levels 4, 8, 12, and 16 can be selected, with at most 3 cells per covering. In this case, a point can be represented with a single cell on the biggest level (e.g., as illustrated in FIG. 16). More specifically, geospatial object 1602 is associated with LatLng: (36.140586, 86.814384), and the Cell ID of covering cell 1604 is 886466af3.

Figure 17:
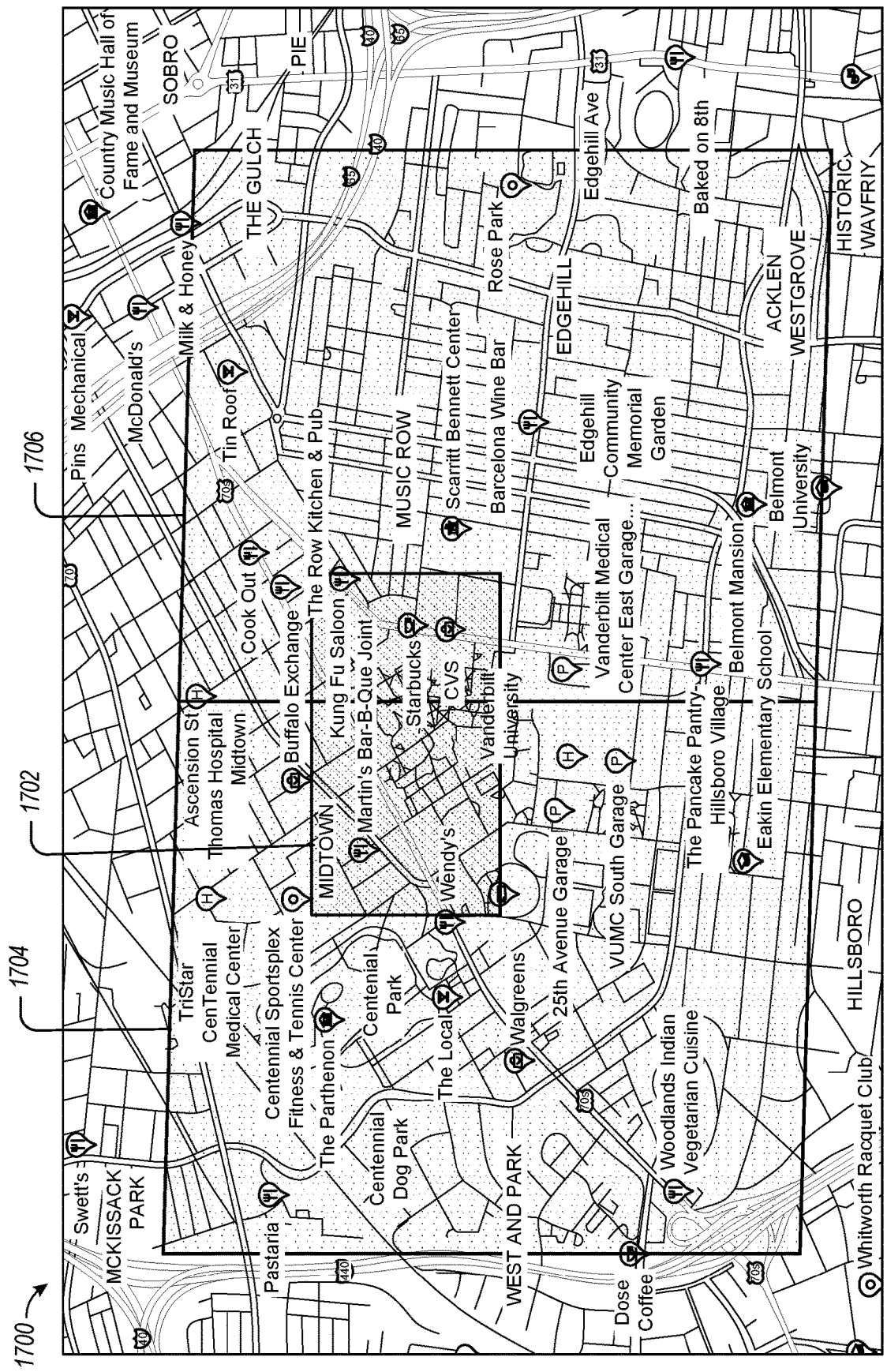
FIG. 17 is a diagram of a geospatial object and multiple covering cells from the S2 spatial indexing scheme, in accordance with some embodiments of the present disclosure.

FIG. 17 is a diagram 1700 of a geospatial object 1702 (e.g., a rectangle) and multiple covering cells 1704 and 1706 from the S2 spatial indexing scheme, in accordance with some embodiments of the present disclosure.

As illustrated in FIG. 17, three cells may not be enough to represent it on S2 level 16, and therefore, the lower S2 level may be used instead (e.g., S2 covering cells 1704 and 1706 at level 12 can be used instead, with cell IDs of 8864669 and 886466b.

Figure 18:
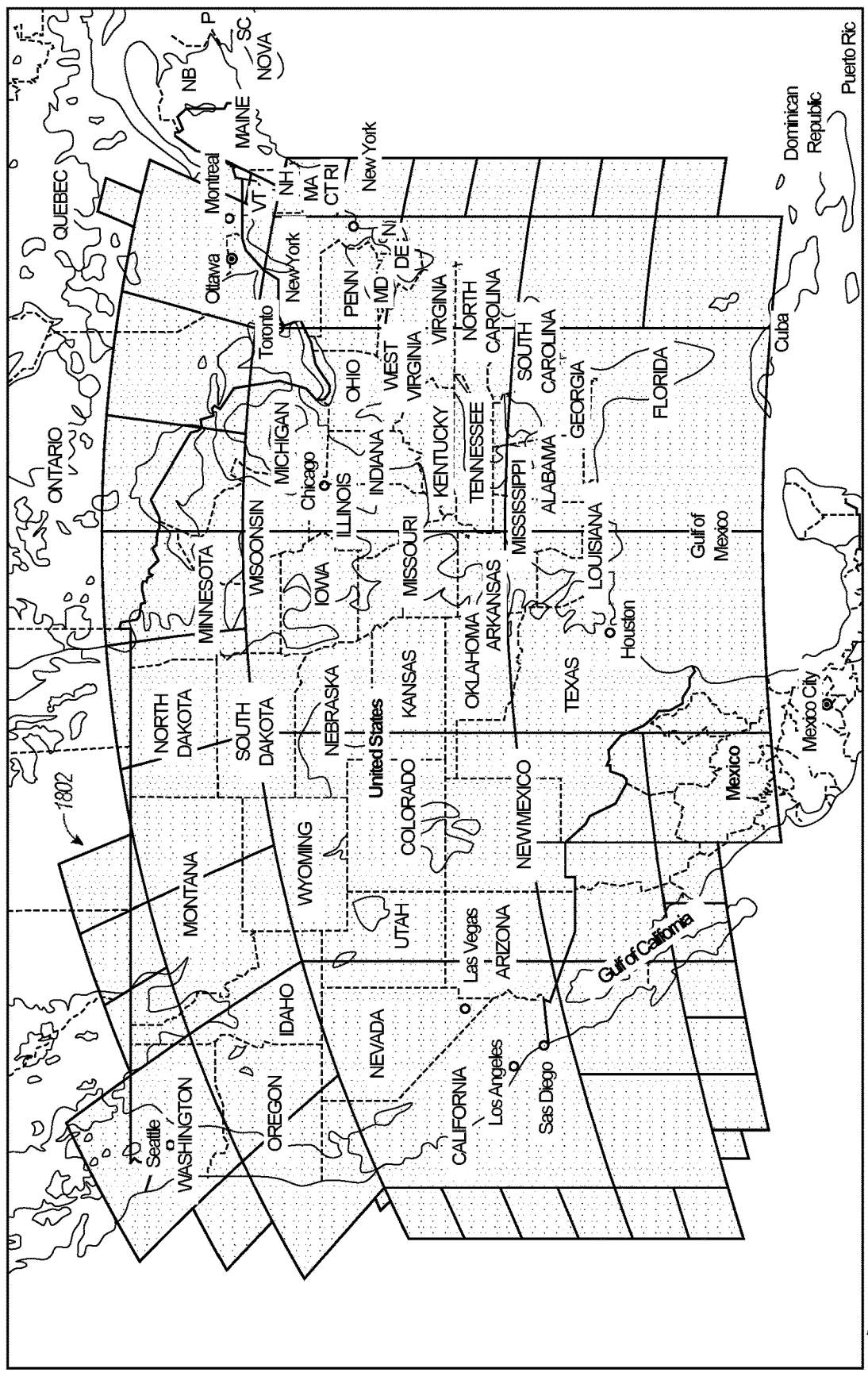
FIG. 18 is a diagram of Level 4 cells of the S2 spatial indexing scheme over the territory of the United States, in accordance with some embodiments of the present disclosure.

FIG. 18 is a diagram 1800 of Level 4 cells 1802 of the S2 spatial indexing scheme over the territory of the United States, in accordance with some embodiments of the present disclosure.

For even bigger geometries, the GPS manager 130 can switch to a lower S2 level. In some aspects, a geometry may become big enough so it may not be represented with Cmax cells even on the lowest level L1. In the example rendering of level 4 cells 1802 in FIG. 18, more than the Cmax number of cells in the covering may be used.

Indexing

In some aspects, the GPS manager 130 can use the following techniques for adding a single geometry G to a search index. Given the geometry G, the GPS manager 130 calculates its covering (e.g., a set of cells forming a covering) as described in the previous section. It can be assumed that this covering produced N cells: C1, . . . , CN. For each cell, the GPS manager 130 calculates its parents on all levels (e.g., the pre-defined number of S2 levels such as levels L1, . . . , L4 used above). Given that covering cells can be on different levels, each cell can have from 0 to 3 parents.

During indexing, the GPS manager 130 can add cells and their parents as separate expressions (e.g., hash functions with different seeds). The GPS manager 130 can add all covering cells with hash function Hc and all parent cells with a hash function Hp. An example geometry (e.g., a line) represented by 2 cells at different levels is illustrated in FIG. 19.

Figure 19:
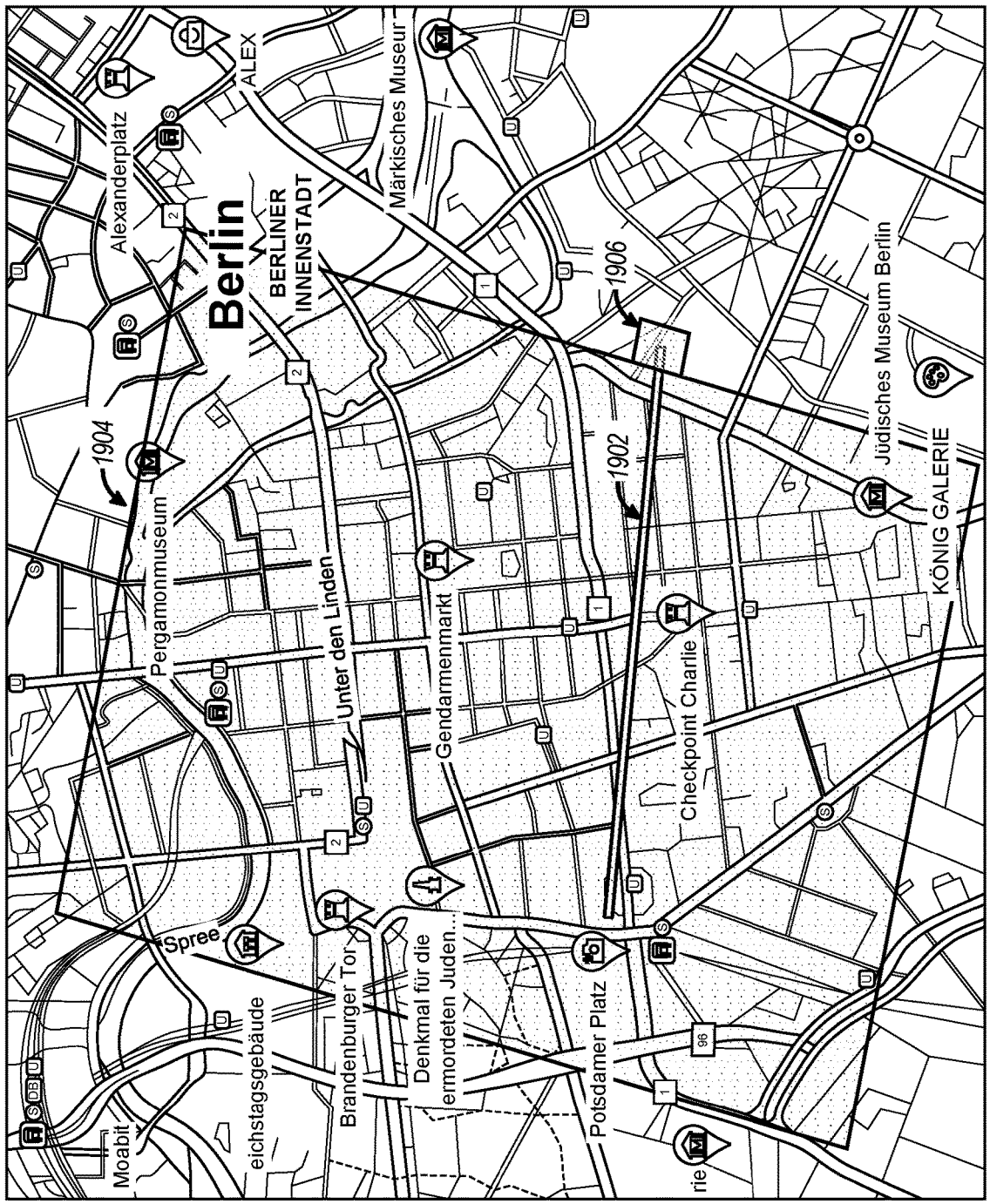
FIG. 19 is a block diagram of a geospatial object (e.g., a line) with corresponding S2 spatial indexing scheme cells forming a covering, in accordance with some embodiments of the present disclosure.

FIG. 19 is a block diagram 1900 of a geospatial object (e.g., a line 1902) with corresponding S2 spatial indexing scheme cells 1904 and 1906 (which are at different S2 levels) forming a covering, in accordance with some embodiments of the present disclosure.

Referring to FIG. 19, the covering of line 1902 includes S2 cell 1904 (with cell ID 47a851d) and S2 cell 1906 (with cell ID 47a84e283). Additionally, cell 1904 includes parent cells with cell IDs 47a85 and 47b, and cell 1906 includes parent cells with cell IDs 47a84e3, 47a85, and 47b.

In some embodiments, the GPS manager 130 is configured to add the following hashing functions Hc (for a covering cell) and Hp (for a parent cell of a covering cell) for the covering illustrated in FIG. 19: Hc: 47a851d; Hc: 47a84e283; Hp: 47a84e3; Hp: 47a85; and Hp: 47b.

FIG. 20 is a diagram of example pseudo-code 2000 for indexing geospatial objects, in accordance with some embodiments of the present disclosure. In some embodiments, the GPS manager 130 can use pseudo-code 2000 for indexing geospatial objects in connection with updating a filter of a search index.

In the pseudo-code 2000 of FIG. 20, SEED_CELLS and SEED_PARENT represent different hash functions for separately adding cells and their parents to the bloom filter of a search index.

Determination of Whether to Perform Pruning

The techniques disclosed herein can be based on the following query with spatial predicate ST_INTERSECTS:

---
select * from table
  where st_intersects(<constant>, table.geography);
---

The GPS manager 130 can use the disclosed indexing techniques in connection with processing the above query to determine whether or not to perform pruning of one or more partitions storing geography data (e.g., a geography data column of table.geography) from the query scan set.

In some aspects, the GPS manager 130 calculates the covering of the query geometry (<constant> in the query above) to obtain a set of S2 cell IDs. For each of those cells, the GPS manager 130 can determine the parent cells (or parents) of the cells in the covering at the predefined levels. As a result, the GPS manager 130 obtains 4 sets of cells (corresponding to the 4 levels of S2 cells): cells of a covering Cq={C1, . . . , Cn} and parent cells Pq={P1, . . . , Pm}.

In some embodiments, a partition is considered relevant (and therefore not pruned) if its bloom filter in the search index contains configurations associated with one of the following 3 cases:

(a) Case 1: one of the Cq cells when hashed with a hash function Hc of a covering cell (namely, one of the geometries in the table has the same cell in its covering);

(b) Case 2: one of the Cq cells when hashed with a hash function Hp of a parent cell (namely, one of the geometries in the table has a parent of a query cell in its covering); and (c) Case 3: one of the parent Pq cells when hashed with a hash function Hc of a covering cell (namely, one of the geometries in the table has a child of a query cell in its covering).

Example configurations associated with the above three cases are discussed in connection with FIGS. 21-24.

In some embodiments, two different hash functions are used for parents and children to distinguish between the case when the indexed geometry and the query geometry have two different coverings with the same parents (such geometries are not related).

FIG. 21, FIG. 22, FIG. 23, and FIG. 24 illustrate example diagrams used in connection with processing a query with a geospatial predicate with the geospatial object of FIG. 19, in accordance with some embodiments of the present disclosure. More specifically, FIGS. 21-24 are based on the example illustrated in FIG. 19 with a geospatial object (e.g., line 1902) and corresponding S2 cells 1904 and 1906 (which are at different S2 levels) forming a covering. As explained above, a Bloom filter of a search index can be updated with the following cells: [covering cells: 47a851d, 47a84e283; parent cells: 47a84e3, 47a85, 47b]. In some aspects, such cells are indexed (e.g., added to a filter of a search index) using hash functions (e.g., based on the cell IDs) Hc (for covering cells), and Hp (for parent cells).

Figure 21:
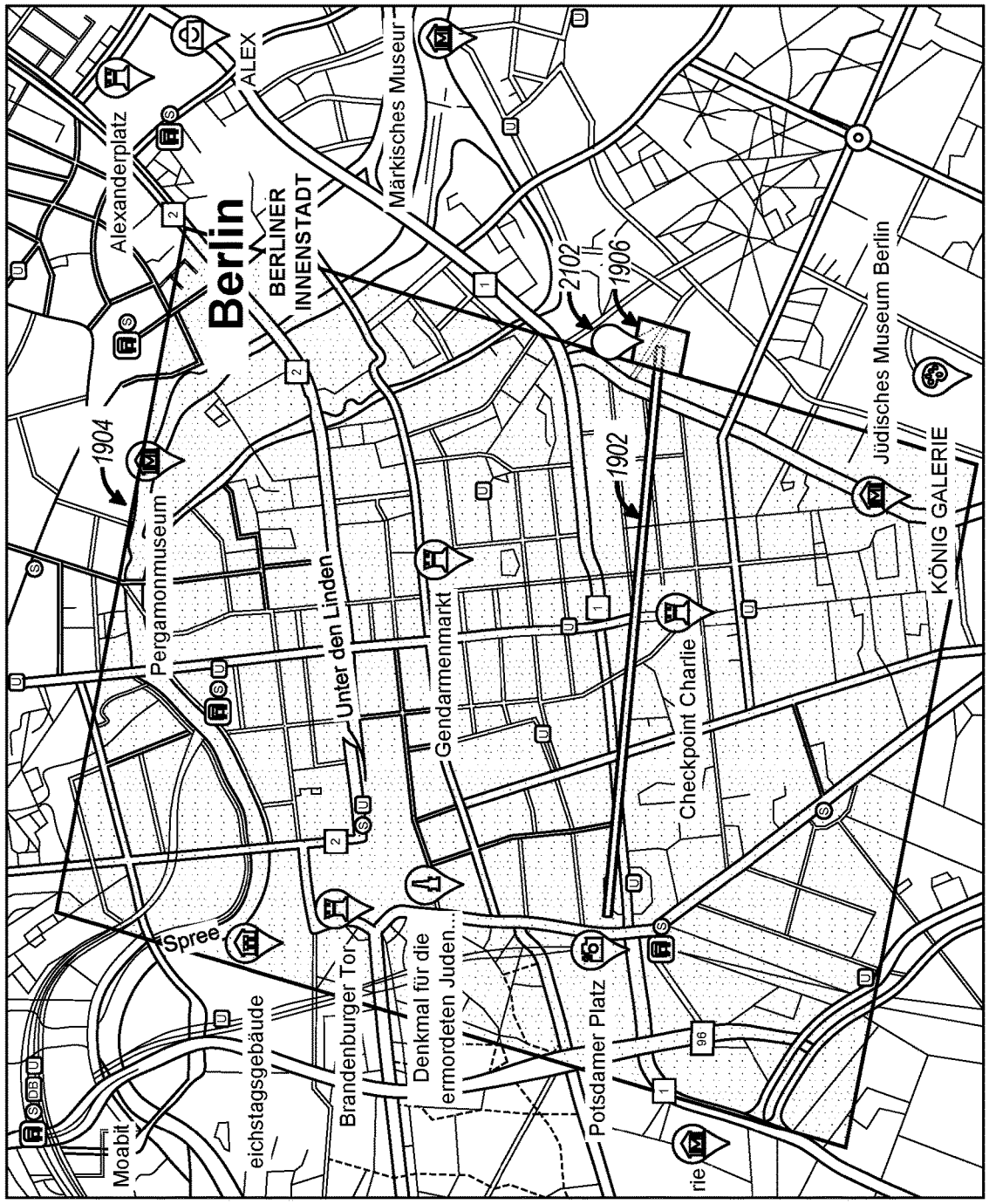
FIG. 21, FIG. 22, FIG. 23, and FIG. 24 illustrate example diagrams used in connection with processing a query with a geospatial predicate with the geospatial object of FIG. 19, in accordance with some embodiments of the present disclosure.

FIG. 21 illustrates a diagram 2100 with geography data (e.g., from a geography data column) represented by line 1902 and covering cells 1904 and 1906. FIG. 21 further illustrates querying a point (e.g., a constant geography object represented by a point 2102) to the same cell. Referring to FIG. 21, the query covering (e.g., the covering of the point 2102) has cell ID 47a84e283, and the query covering parent cells have cell IDs 47a84e3, 47a85, and 47b. In this regard, the indexed filter satisfies the following condition filter.contains (Hc(47a84e283))=YES (this is a check on whether the filter contains the specific cell ID as a hash of a covering cell), indicating one of the geometries in the table has the same cell in its covering. Therefore, since there is a match, the partition with the geography data column of line 1902 is relevant and may not be pruned.

Figure 22:
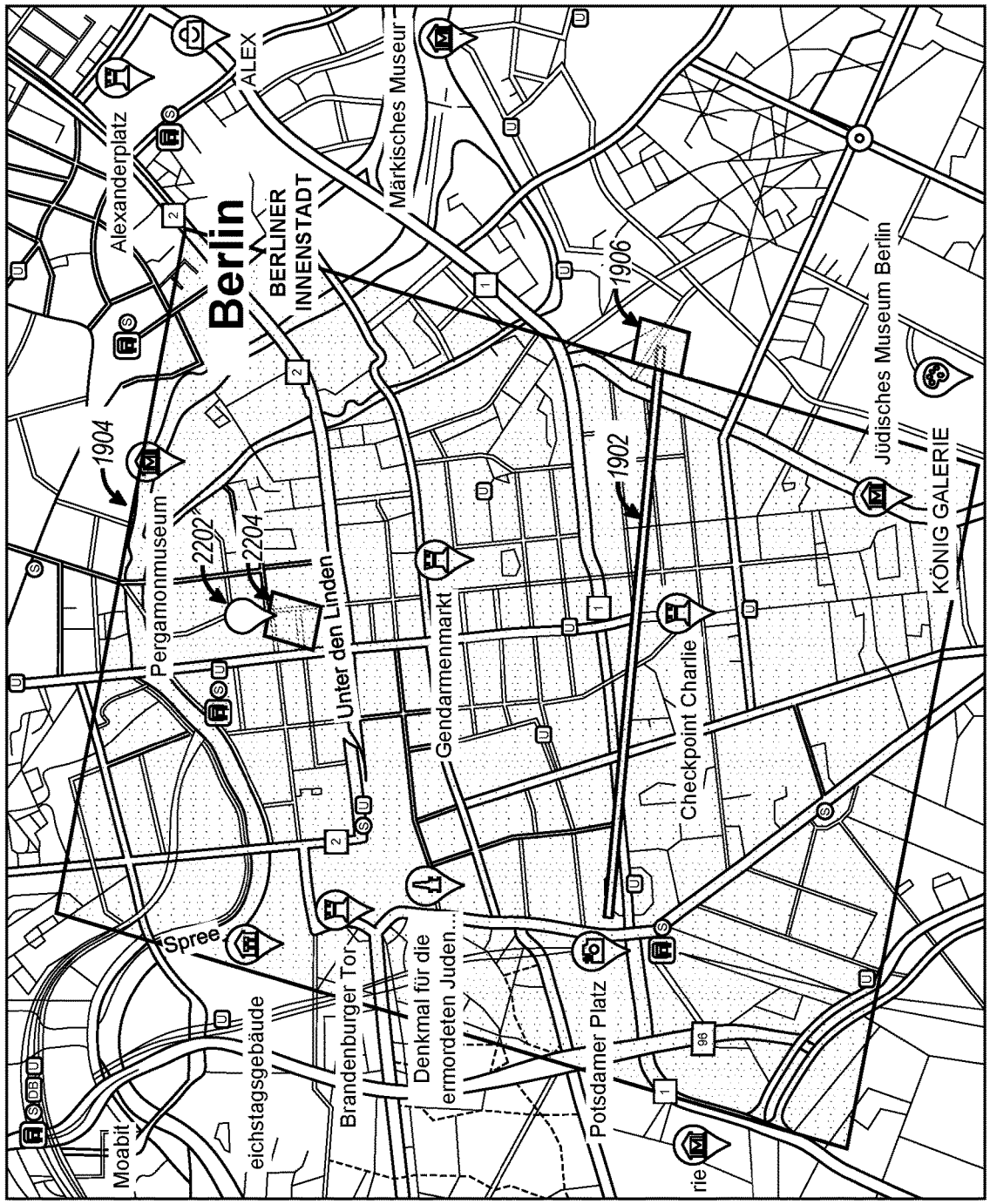

FIG. 22 illustrates a diagram 2200 with geography data (e.g., from a geography data column) represented by line 1902 and covering cells 1904 and 1906. FIG. 22 further illustrates querying a point (e.g., a constant geography object represented by a point 2202) in the same cell but at a different level. Referring to FIG. 22, the query covering (e.g., cell 2204 which is the covering of point 2202) has cell ID 47a851db5, and the query covering parent cells have cell IDs 47a851d, 47a85, and 47b. The GPS manager 130 can compare the indexed filter of the search index and compare hash functions (e.g., cell IDs or other functions based on the cell IDs) of the constant geography object with hash functions (e.g., cell IDs or other functions based on the cell IDs) of the geography data column (e.g., the covering cells and parent cells data associated with line 1902). The GPS manager 130 can determine the following conditions after performing the hash function comparisons: filter.contains (Hc (47a851db5))=NO (this is a check on whether the filter contains the specific cell ID as a hash of a covering cell), filter.contains (Hp(47a851db5))=NO (this is a check on whether the filter contains the specific cell ID as a hash of a parent cell), and filter.contains (Hc(47a851d))=YES. Therefore, since there is a match, the partition with the geography data column of line 1902 is relevant and may not be pruned.

Figure 23:
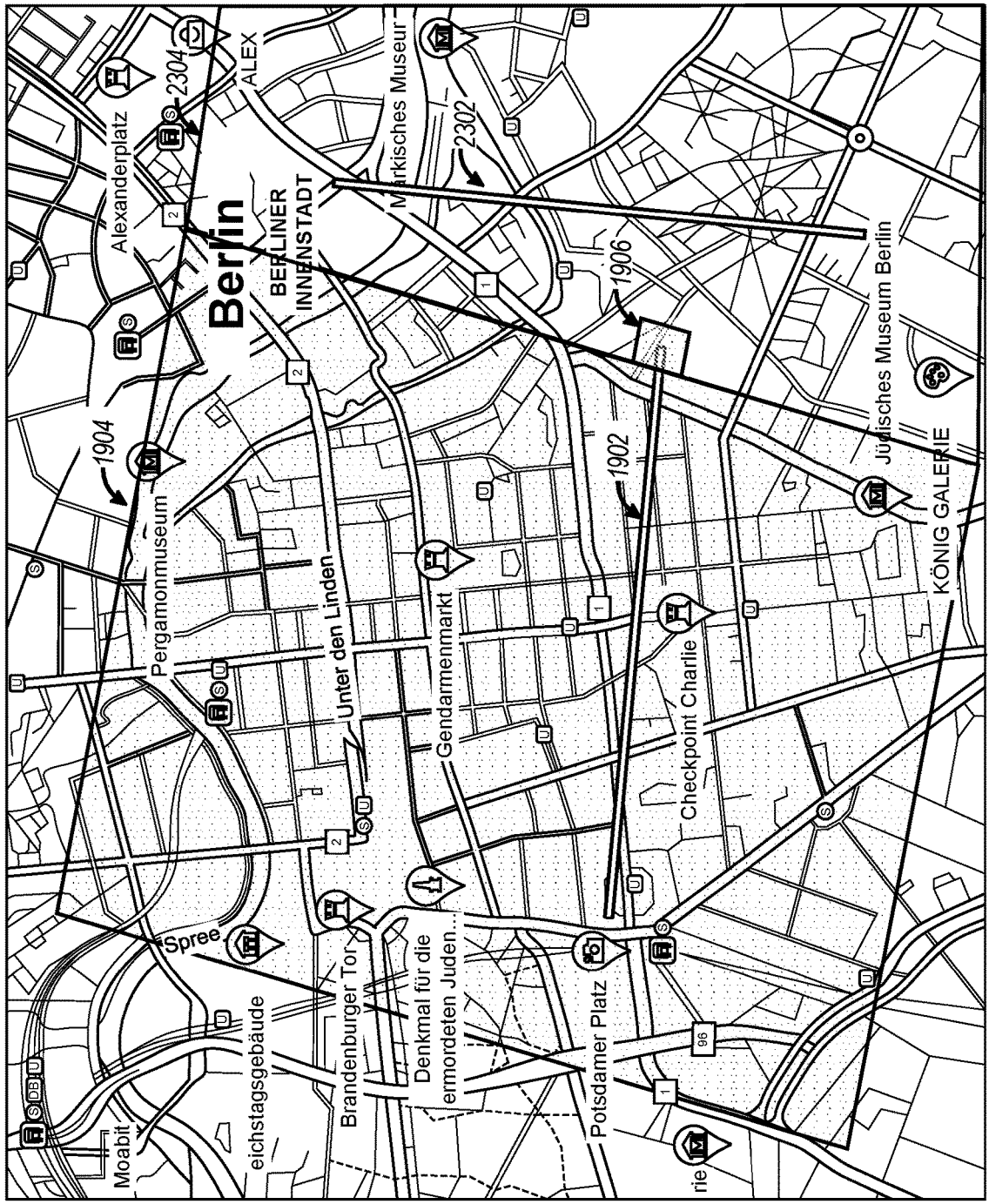

FIG. 23 illustrates a diagram 2300 with geography data (e.g., from a geography data column) represented by line 1902 and covering cells 1904 and 1906. FIG. 23 further illustrates querying a line (e.g., a constant geography object represented by line 2302) in a different, bigger cell (e.g., covering cell 2304 of line 2302 is bigger than covering cell 1906 of line 1902). Referring to FIG. 23, the query covering (e.g., cell 2304 covering line 2302) has cell ID 47a84e3, and the query covering parent cells have cell IDs 47a85 and 47b. The GPS manager 130 can compare the indexed filter of the search index and compare hash functions (e.g., cell IDs or other functions based on the cell IDs) of the constant geography object with hash functions (e.g., cell IDs or other functions based on the cell IDs) of the geography data column (e.g., the covering cells and parent cells data associated with line 1902). The GPS manager 130 can determine the following conditions after performing the hash function comparisons: filter.contains(Hc(47a84e3))=NO (this is a check on whether the filter contains the specific cell ID as a hash of a covering cell) and filter.contains (Hp(47a84e3))=YES (this is a check on whether the filter contains the specific cell ID as a hash of a parent cell). Therefore, since there is a match, the partition with the geography data column of line 1902 is relevant and may not be pruned.

Figure 24:
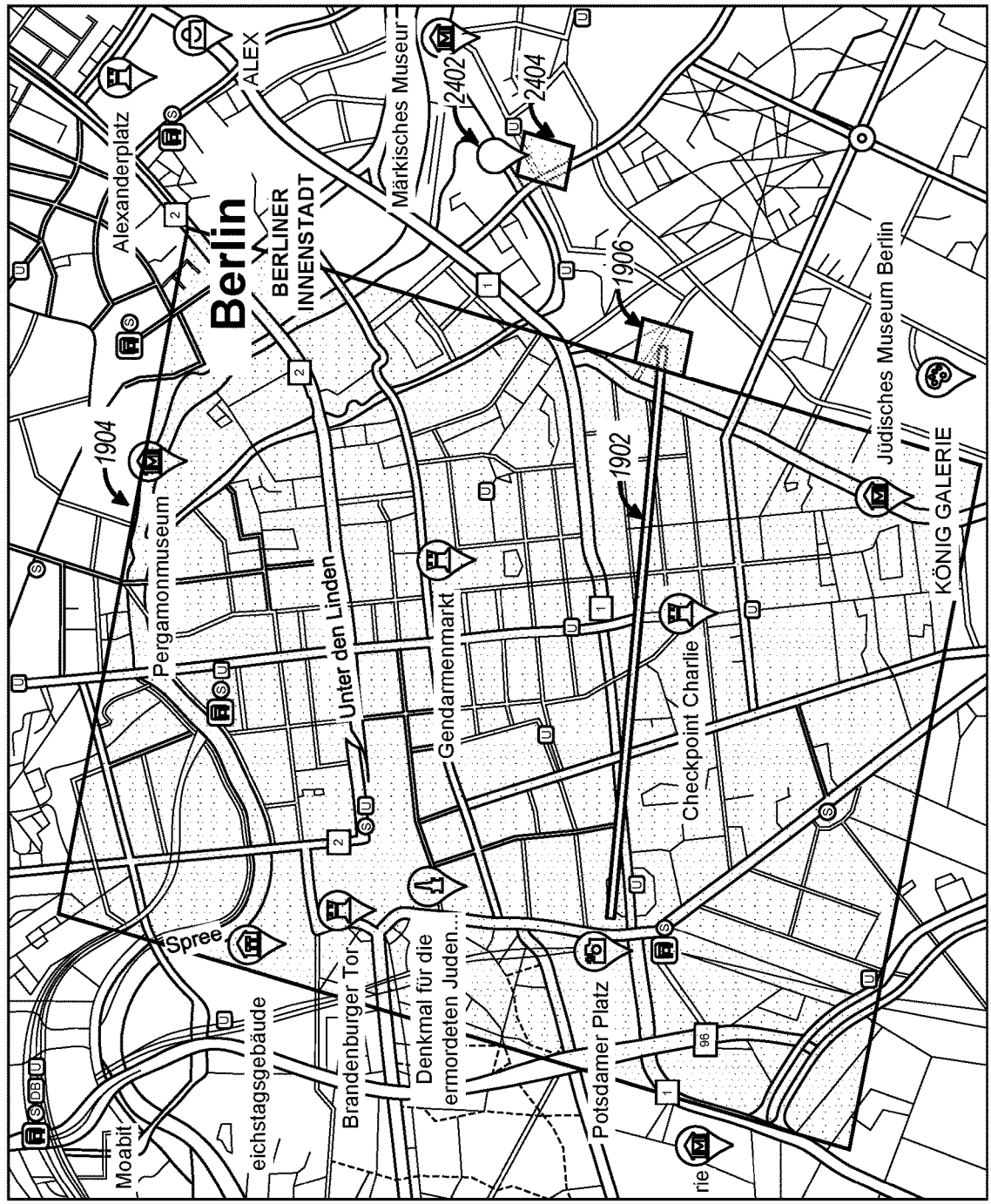

FIG. 24 illustrates a diagram 2400 with geography data (e.g., from a geography data column) represented by line 1902 and covering cells 1904 and 1906. FIG. 24 further illustrates querying a point (e.g., a constant geography object represented by point 2402) associated with an unrelated cell (e.g., covering cell 2404) with a common parent. Referring to FIG. 24, the query covering (e.g., cell 2404 covering point 2402) has cell ID 47a84e267, and the query covering parent cells have cell IDs 47a84e3, 47a85, and 47b. The GPS manager 130 can compare the indexed filter of the search index and compare hash functions (e.g., cell IDs or other functions based on the cell IDs) of the constant geography object with hash functions (e.g., cell IDs or other functions based on the cell IDs) of the geography data column (e.g., the covering cells and parent cells data associated with line 1902). The GPS manager 130 can determine the following conditions after performing the hash function comparisons: filter.contains (Hc(47a84e267))=NO (this is a check on whether the filter contains the specific cell ID as a hash of a covering cell), filter.contains (Hp (47a84e267))=NO (this is a check on whether the filter contains the specific cell ID as a hash of a parent cell), filter.contains (47a84e3)=NO, filter.contains (47a85)=NO, and filter.contains (47b)=NO. Therefore, since there is no match in all comparisons of the hash functions, the partition with the geography data column of line 1902 is not relevant and may be pruned (in the above case, the Bloom filter of the search index contains the parent cells, but they are hashed with different hash functions).

In some aspects, the GPS manager 130 can process geospatial predicates with stricter conditions for Cases 1-3 than the ST_INTERSECTS predicate processing discussed above.

FIG. 25 is a diagram of an example pseudo-code 2500 for processing a query with a geospatial predicate of ST_INTERSECT, in accordance with some embodiments of the present disclosure. Referring to FIG. 25, pseudo-code 2500 may be used by the GPS manager 130 to determine if two geometries intersect. In some aspects, this predicate includes the most relaxed condition where at least one cell must be found in the index.

FIG. 26 is a diagram of example pseudo-code 2600 for processing a query with a geospatial predicate of ST_CONTAINS or ST_COVERS, in accordance with some embodiments of the present disclosure. Referring to FIG. 26, pseudo-code 2600 may be used by the GPS manager 130 to determine if one geometry contains or covers another. For containment, the GPS manager 130 may not need to check for the parent cells of the query covering (e.g., only Case 1 and Case 2 may be considered).

FIG. 27 is a diagram of example pseudo-code 2700 for processing a query with a geospatial predicate of ST_WITHIN or ST_COVEREDBY, in accordance with some embodiments of the present disclosure. Referring to FIG. 27, pseudo-code 2700 may be used by the GPS manager 130 to determine if one geometry is within another geometry. For ST_WITHIN, the GPS manager 130 can perform a determination for each cell in the query covering that either it or one of its parents is in the index.

In some embodiments, the GPS manager 130 can also process other geospatial predicates, such as ST_DWITHIN. In connection with determining if a partition should be pruned, the GPS manager 130 can determine if the distance can be rewritten as an intersection check against the expanded bounding box: ST_DWITHIN(G1, G2, D)~ST_INTERSETCS(ST_ENVELOPE(G1, D), G2).

Figure 28:
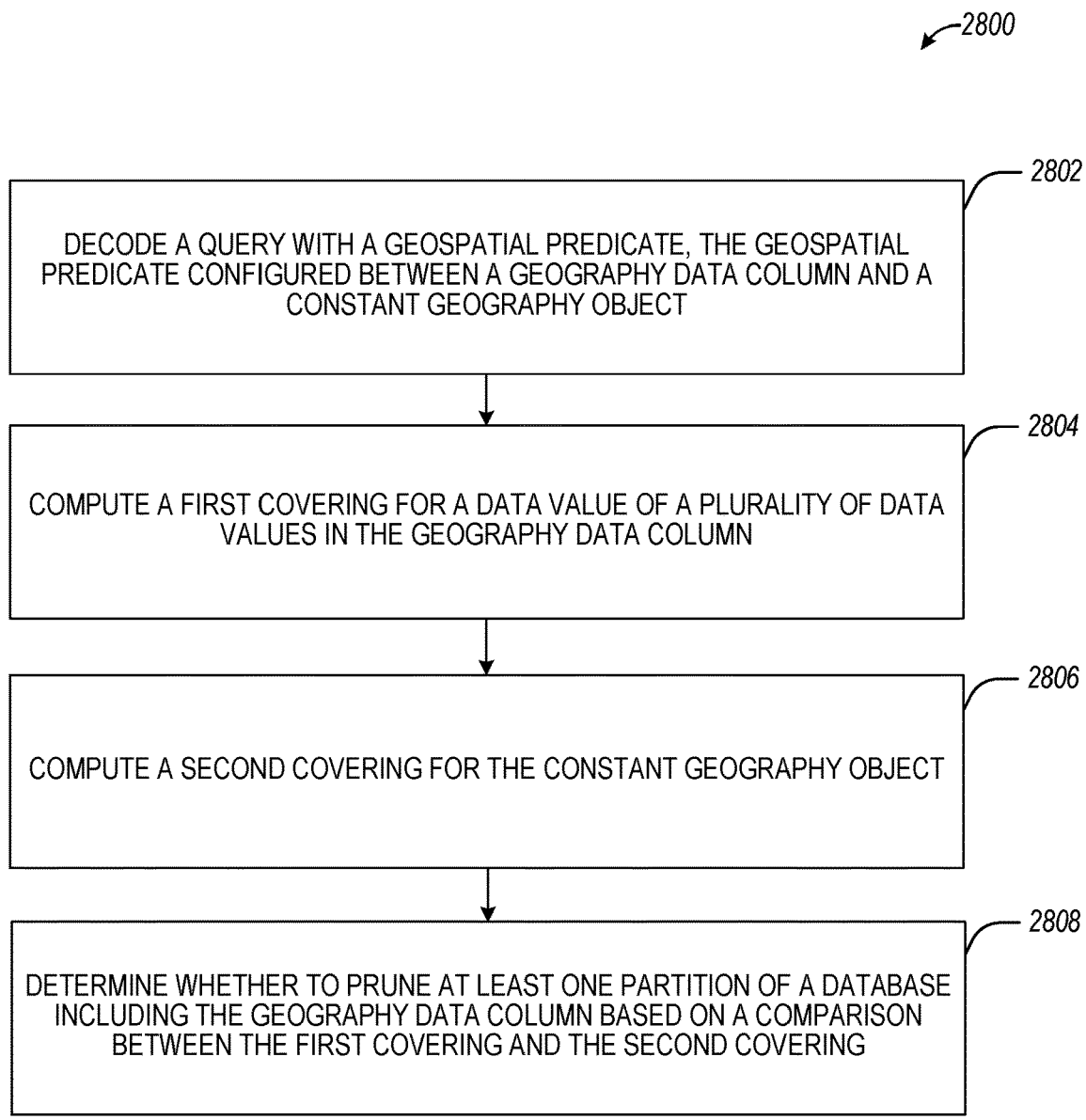
FIG. 28 is a flow diagram illustrating operations of a database system in performing a method for processing a query with a geospatial predicate, in accordance with some embodiments of the present disclosure.

FIG. 28 is a flow diagram illustrating operations of a database system in performing a method 2800 for processing a query with a geospatial predicate, in accordance with some embodiments of the present disclosure. Method 2800 may be embodied in computer-readable instructions for execution by one or more hardware components (e.g., one or more processors) such that the operations of method 2800 may be performed by components of the network-based database system 102, such as components of the compute service manager 108 (e.g., the GPS manager 130) and/or the execution platform 110 (e.g., which components may be implemented as machine 2900 of FIG. 29). Accordingly, method 2800 is described below, by way of example with reference thereto. However, it shall be appreciated that method 2800 may be deployed on various other hardware configurations and is not intended to be limited to deployment within the network-based database system 102.

At operation 2802, a query with a geospatial predicate is decoded (e.g., the ST_INTERSECTS predicate discussed in connection with FIGS. 19-24). The geospatial predicate (e.g., ST_INTERSECTS) is configured between a geography data column and a constant geography object.

At operation 2804, the first covering for a data value of a plurality of data values in the geography data column is computed (e.g., the covering of the geography data column represented by line 1902 and as discussed in connection with FIGS. 19-24). The first covering includes a first set of cells in a hierarchical grid representation of a geography (e.g., cells 1904 and 1906). The first set of cells represents a surface of the geography associated with the data value (e.g., cells 1904 and 1906 represent a portion of the Earth with a surface covering the line 1902).

At operation 2806, a second covering is computed for the constant geography object (e.g., one of the constant geography objects discussed in connection with FIGS. 21-24).

At operation 2808, a determination is made on whether to prune at least one partition of a database including the geography data column based on a comparison between the first covering and the second covering. For example, corresponding pruning determinations are made as discussed in connection with FIGS. 21-24.

Figure 29:
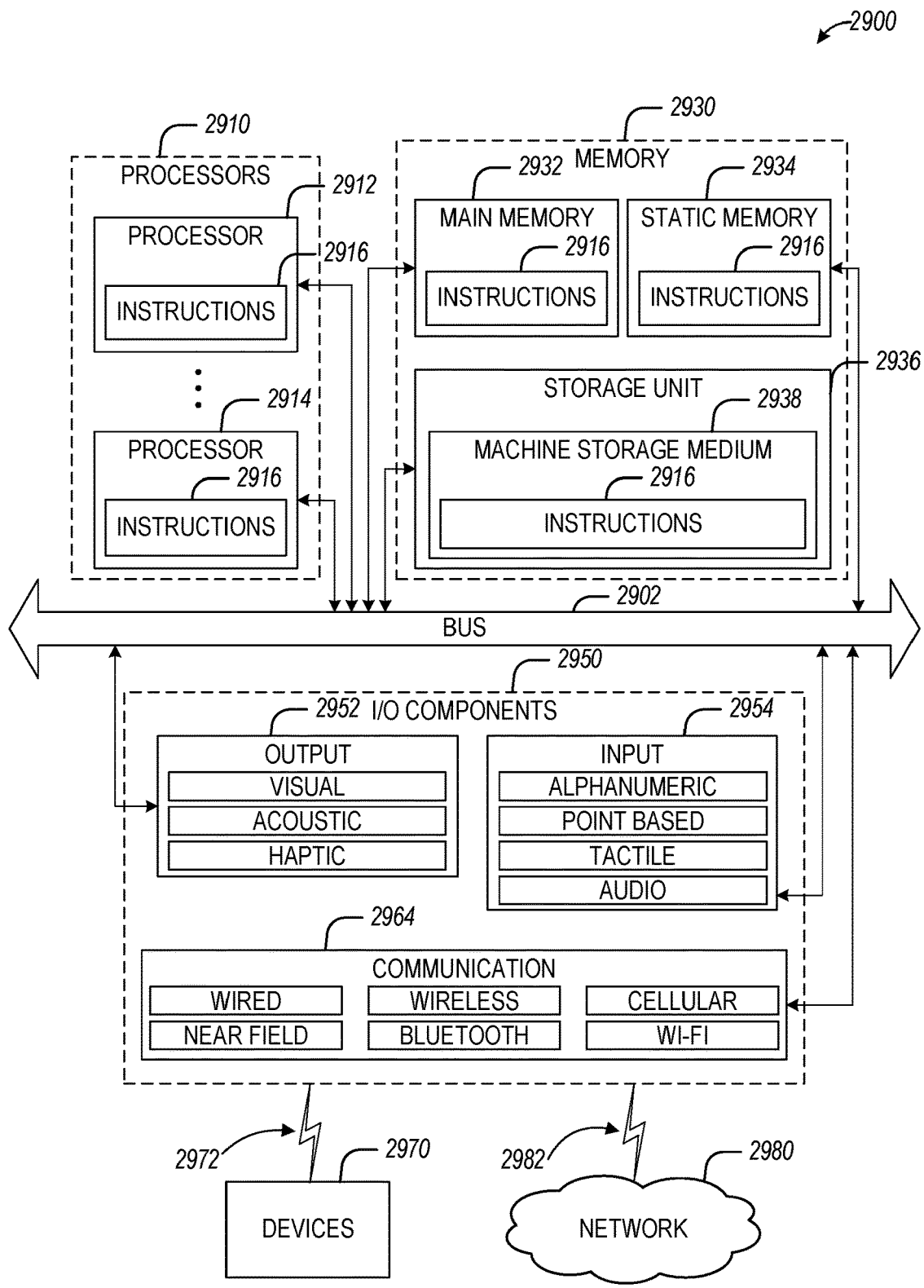
FIG. 29 illustrates a diagrammatic representation of a machine in the form of a computer system within which a set of instructions may be executed for causing the machine to perform any one or more of the methodologies discussed herein, in accordance with some embodiments of the present disclosure.

FIG. 29 illustrates a diagrammatic representation of a machine 2900 in the form of a computer system within which a set of instructions may be executed for causing the machine 2900 to perform any one or more of the methodologies discussed herein, according to an example embodiment. Specifically, FIG. 29 shows a diagrammatic representation of the machine 2900 in the example form of a computer system, within which instructions 2916 (e.g., software, a program, an application, an applet, an app, or other executable code) for causing the machine 2900 to perform any one or more of the methodologies discussed herein may be executed. For example, instructions 2916 may cause machine 2900 to execute any one or more operations of disclosed methods such as method 2800 (or any other technique discussed herein, for example in connection with FIG. 4-FIG. 28). As another example, instructions 2916 may cause machine 2900 to implement one or more portions of the functionalities discussed herein. In this way, instructions 2916 may transform a general, non-programmed machine into a particular machine 2900 (e.g., the compute service manager 108 or a node in the execution platform 110) that is specially configured to carry out any one of the described and illustrated functions in the manner described herein. In yet another embodiment, instructions 2916 may configure the compute service manager 108 and/or a node in the execution platform 110 to carry out any one of the described and illustrated functions in the manner described herein.

In alternative embodiments, the machine 2900 operates as a standalone device or may be coupled (e.g., networked) to other machines. In a networked deployment, the machine 2900 may operate in the capacity of a server machine or a client machine in a server-client network environment, or as a peer machine in a peer-to-peer (or distributed) network environment. The machine 2900 may comprise, but not be limited to, a server computer, a client computer, a personal computer (PC), a tablet computer, a laptop computer, a netbook, a smartphone, a mobile device, a network router, a network switch, a network bridge, or any machine capable of executing the instructions 2916, sequentially or otherwise, that specify actions to be taken by the machine 2900. Further, while only a single machine 2900 is illustrated, the term "machine" shall also be taken to include a collection of machines 2900 that individually or jointly execute the instructions 2916 to perform any one or more of the methodologies discussed herein.

Machine 2900 includes processors 2910, memory 2930, and input/output (I/O) components 2950 configured to communicate with each other such as via a bus 2902. In some example embodiments, the processors 2910 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 2912 and a processor 2914 that may execute the instructions 2916. The term "processor" is intended to include multi-core processors 2910 that may comprise two or more independent processors (sometimes referred to as "cores") that may execute instructions 2916 contemporaneously. Although FIG. 29 shows multiple processors 2910, the machine 2900 may include a single processor with a single core, a single processor with multiple cores (e.g., a multi-core processor), multiple processors with a single core, multiple processors with multiple cores, or any combination thereof.

The memory 2930 may include a main memory 2932, a static memory 2934, and a storage unit 2936, all accessible to the processors 2910 such as via the bus 2902. The main memory 2932, the static memory 2934, and the storage unit 2936 store the instructions 2916 embodying any one or more of the methodologies or functions described herein. The instructions 2916 may also reside, completely or partially, within the main memory 2932, within the static memory 2934, within machine storage medium 2938 of the storage unit 2936, within at least one of the processors 2910 (e.g., within the processor's cache memory), or any suitable combination thereof, during execution thereof by the machine 2900.

The I/O components 2950 include components to receive input, provide output, produce output, transmit information, exchange information, capture measurements, and so on. The specific I/O components 2950 that are included in a particular machine 2900 will depend on the type of machine. For example, portable machines such as mobile phones will likely include a touch input device or other such input mechanisms, while a headless server machine will likely not include such a touch input device. It will be appreciated that the I/O components 2950 may include many other components that are not shown in FIG. 29. The I/O components 2950 are grouped according to functionality merely for simplifying the following discussion and the grouping is in no way limiting. In various example embodiments, the I/O components 2950 may include output components 2952 and input components 2954. The output components 2952 may include visual components (e.g., a display such as a plasma display panel (PDP), a light-emitting diode (LED) display, a liquid crystal display (LCD), a projector, or a cathode ray tube (CRT)), acoustic components (e.g., speakers), other signal generators, and so forth. The input components 2954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touches gestures or other tactile input components), audio input components (e.g., a microphone), and the like.

Communication may be implemented using a wide variety of technologies. The I/O components 2950 may include communication components 2964 operable to couple the machine 2900 to a network 2980 or devices 2970 via a coupling 2982 and a coupling 2972, respectively. For example, the communication components 2964 may include a network interface component or another suitable device to interface with the network 2980. In further examples, the communication components 2964 may include wired communication components, wireless communication components, cellular communication components, and other communication components to provide communication via other modalities. The device 2970 may be another machine or any of a wide variety of peripheral devices (e.g., a peripheral device coupled via a universal serial bus (USB)). For example, as noted above, machine 2900 may correspond to any one of the compute service manager 108 or the execution platform 110, and the device 2970 may include the client device 114 or any other computing device described herein as being in communication with the network-based database system 102, the storage platform 104, or the cloud storage platforms 122.

The various memories (e.g., 2930, 2932, 2934, and/or memory of the processor(s) 2910 and/or the storage unit 2936) may store one or more sets of instructions 2916 and data structures (e.g., software) embodying or utilized by any one or more of the methodologies or functions described herein. These instructions 2916, when executed by the processor(s) 2910, cause various operations to implement the disclosed embodiments.

As used herein, the terms "machine-storage medium," "device-storage medium," and "computer-storage medium" mean the same thing and may be used interchangeably in this disclosure. The terms refer to single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 2980 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 2980 or a portion of the network 2980 may include a wireless or cellular network, and the coupling 2982 may be a Code Division Multiple Access (CDMA) connection, a Global System for Mobile communications (GSM) connection, or another type of cellular or wireless coupling. In this example, the coupling 2982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 2916 may be transmitted or received over the network 2980 using a transmission medium via a network interface device (e.g., a network interface component included in the communication components 2964) and utilizing any one of several well-known transfer protocols (e.g., hypertext transfer protocol (HTTP)). Similarly, instructions 2916 may be transmitted or received using a transmission medium via the coupling 2972 (e.g., a peer-to-peer coupling) to the device 2970. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 2916 for execution by the machine 2900, and include digital or analog communications signals or other intangible media to facilitate communication of such software. Hence, the terms "transmission medium" and "signal medium" shall be taken to include any form of a modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the disclosed methods may be performed by one or more processors. The performance of some of the operations may be distributed among the one or more processors, not only residing within a single machine but also deployed across several machines. In some example embodiments, the processor or processors may be located in a single location (e.g., within a home environment, an office environment, or a server farm), while in other embodiments the processors may be distributed across several locations.

Described implementations of the subject matter can include one or more features, alone or in combination as illustrated below by way of examples.

Example 1 is a system comprising: at least one hardware processor; and at least one memory storing instructions that cause the at least one hardware processor to perform operations comprising: decoding a query with a geospatial predicate, the geospatial predicate configured between a geography data column and a constant geography object; computing a first covering for a data value of a plurality of data values in the geography data column, the first covering including a first set of cells in a hierarchical grid representation of a geography, and the first set of cells representing a surface of the geography associated with the data value; computing a second covering for the constant geography object, and determining whether to prune at least one partition of a database including the geography data column based on a comparison between the first covering and the second covering. The database is organized into a set of partitions including the at least one partition.

In Example 2, the subject matter of Example 1 includes subject matter where the instructions further cause the at least one hardware processor to perform operations comprising: computing the second covering as a second set of cells in the hierarchical grid representation of the geography, and the second set of cells representing a surface of the geography associated with the constant geography object.

In Example 3, the subject matter of Example 2 includes subject matter where the instructions further cause the at least one hardware processor to perform operations comprising: computing a first extended covering for the data value, the first extended covering comprising the first set of cells, and a first set of additional cells that are parent cells of the first set of cells in the hierarchical grid representation.

In Example 4, the subject matter of Example 3 includes subject matter where the instructions further cause the at least one hardware processor to perform operations comprising: computing the first set of additional cells for a pre-configured number of layers in the hierarchical grid representation.

In Example 5, the subject matter of Examples 3-4 includes subject matter where the instructions further cause the at least one hardware processor to perform operations comprising: computing a hash function for each cell of the first set of cells to obtain a first set of hash functions; and computing a hash function for each cell of the first set of additional cells to obtain a first additional set of hash functions.

In Example 6, the subject matter of Example 5 includes subject matter where the instructions further cause the at least one hardware processor to perform operations comprising: computing the first set of hash functions based on a cell ID for each cell of the first set of cells; and computing the first additional set of hash functions based on a cell ID for each cell of the first set of additional cells.

In Example 7, the subject matter of Examples 5-6 includes subject matter where the instructions further cause the at least one hardware processor to perform operations comprising: computing a second extended covering for the constant geography object, the second extended covering comprising the second set of cells and a second set of additional cells that are parent cells of the second set of cells in the hierarchical grid representation.

In Example 8, the subject matter of Example 7 includes subject matter where the instructions further cause the at least one hardware processor to perform operations comprising: computing a hash function for each cell of the second set of cells to obtain a second set of hash functions, the second set of hash functions based on a cell ID for each cell of the second set of cells; and computing a hash function for each cell of the second set of additional cells to obtain a second additional set of hash functions, the second additional set of hash functions based on a cell ID for each cell of the second set of additional cells.

In Example 9, the subject matter of Example 8 includes subject matter where the instructions further cause the at least one hardware processor to perform operations comprising: updating a filter of a search index to include the first set of hash functions and the first additional set of hash functions.

In Example 10, the subject matter of Example 9 includes subject matter where the instructions further cause the at least one hardware processor to perform operations comprising: determining whether to prune the at least one partition of the database based on a comparison between the second set of hash functions and the second additional set of hash functions with the first set of hash functions and the first additional set of hash functions in the filter of the search index.

Example 11 is a method comprising: performing by at least one hardware processor operations comprising: decoding a query with a geospatial predicate, the geospatial predicate configured between a geography data column and a constant geography object; computing a first covering for a data value of a plurality of data values in the geography data column, the first covering including a first set of cells in a hierarchical grid representation of a geography, and the first set of cells representing a surface of the geography associated with the data value; computing a second covering for the constant geography object, and determining whether to prune at least one partition of a database including the geography data column based on a comparison between the first covering and the second covering. The database is organized into a set of partitions including the at least one partition.

In Example 12, the subject matter of Example 11 includes, computing the second covering as a second set of cells in the hierarchical grid representation of the geography, and the second set of cells representing a surface of the geography associated with the constant geography object.

In Example 13, the subject matter of Example 12 includes, computing a first extended covering for the data value, the first extended covering comprising the first set of cells, and a first set of additional cells that are parent cells of the first set of cells in the hierarchical grid representation.

In Example 14, the subject matter of Example 13 includes, computing the first set of additional cells for a pre-configured number of layers in the hierarchical grid representation.

In Example 15, the subject matter of Examples 13-14 includes, computing a hash function for each cell of the first set of cells to obtain a first set of hash functions; and computing a hash function for each cell of the first set of additional cells to obtain a first additional set of hash functions.

In Example 16, the subject matter of Example 15 includes, computing the first set of hash functions based on a cell ID for each cell of the first set of cells; and computing the first additional set of hash functions based on a cell ID for each cell of the first set of additional cells.

In Example 17, the subject matter of Examples 15-16 includes, computing a second extended covering for the constant geography object, the second extended covering comprising the second set of cells, and a second set of additional cells that are parent cells of the second set of cells in the hierarchical grid representation.

In Example 18, the subject matter of Example 17 includes, computing a hash function for each cell of the second set of cells to obtain a second set of hash functions, the second set of hash functions based on a cell ID for each cell of the second set of cells; and computing a hash function for each cell of the second set of additional cells to obtain a second additional set of hash functions, the second additional set of hash functions based on a cell ID for each cell of the second set of additional cells.

In Example 19, the subject matter of Example 18 includes, updating a filter of a search index to include the first set of hash functions and the first additional set of hash functions.

In Example 20, the subject matter of Example 19 includes, determining whether to prune the at least one partition of the database based on a comparison between the second set of hash functions and the second additional set of hash functions with the first set of hash functions and the first additional set of hash functions in the filter of the search index.

Example 21 is a computer-storage medium comprising instructions that, when executed by one or more processors of a machine, configure the machine to perform operations comprising: decoding a query with a geospatial predicate, the geospatial predicate configured between a geography data column, and a constant geography object; computing a first covering for a data value of a plurality of data values in the geography data column, the first covering including a first set of cells in a hierarchical grid representation of a geography, and the first set of cells representing a surface of the geography associated with the data value; computing a second covering for the constant geography object, and determining whether to prune at least one partition of a database including the geography data column based on a comparison between the first covering and the second covering. The database is organized into a set of partitions including the at least one partition.

In Example 22, the subject matter of Example 21 includes, the operations further comprising: computing the second covering as a second set of cells in the hierarchical grid representation of the geography, and the second set of cells representing a surface of the geography associated with the constant geography object.

In Example 23, the subject matter of Example 22 includes, the operations further comprising: computing a first extended covering for the data value, the first extended covering comprising the first set of cells, and a first set of additional cells that are parent cells of the first set of cells in the hierarchical grid representation.

In Example 24, the subject matter of Example 23 includes, the operations further comprising: computing the first set of additional cells for a pre-configured number of layers in the hierarchical grid representation.

In Example 25, the subject matter of Examples 23-24 includes, the operations further comprising: computing a hash function for each cell of the first set of cells to obtain a first set of hash functions and computing a hash function for each cell of the first set of additional cells to obtain a first additional set of hash functions.

In Example 26, the subject matter of Example 25 includes, the operations further comprising: computing the first set of hash functions based on a cell ID for each cell of the first set of cells; and computing the first additional set of hash functions based on a cell ID for each cell of the first set of additional cells.

In Example 27, the subject matter of Examples 25-26 includes, the operations further comprising: computing a second extended covering for the constant geography object, the second extended covering comprising the second set of cells, and a second set of additional cells that are parent cells of the second set of cells in the hierarchical grid representation.

In Example 28, the subject matter of Example 27 includes, the operations further comprising: computing a hash function for each cell of the second set of cells to obtain a second set of hash functions, the second set of hash functions based on a cell ID for each cell of the second set of cells; and computing a hash function for each cell of the second set of additional cells to obtain a second additional set of hash functions, the second additional set of hash functions based on a cell ID for each cell of the second set of additional cells.

In Example 29, the subject matter of Example 28 includes, the operations further comprising: updating a filter of a search index to include the first set of hash functions and the first additional set of hash functions.

In Example 30, the subject matter of Example 29 includes, the operations further comprising: determining whether to prune the at least one partition of the database based on a comparison between the second set of hash functions and the second additional set of hash functions with the first set of hash functions and the first additional set of hash functions in the filter of the search index.

Example 31 is at least one machine-readable medium including instructions that, when executed by processing circuitry, cause the processing circuitry to perform operations to implement any of Examples 1-30.

Example 32 is an apparatus comprising means to implement any of Examples 1-30.

Example 33 is a system to implement any of Examples 1-30.

Example 34 is a method to implement any of Examples 1-30.

Although the embodiments of the present disclosure have been described concerning specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is disclosed. Thus, although specific embodiments have been illustrated and described herein, it should be appreciated that any arrangement calculated to achieve the same purpose may be substituted for the specific embodiments shown. This disclosure is intended to cover any adaptations or variations of various embodiments. Combinations of the above embodiments, and other embodiments not specifically described herein, will be apparent to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
   at least one hardware processor; and
   at least one memory storing instructions that cause the at least one hardware processor to perform operations comprising:
   decoding a query with a geospatial predicate, the geospatial predicate specifying a geography data column and a constant geography object;
   computing a first covering for a data value of a plurality of data values in the geography data column, the first covering including a first set of cells in a hierarchical grid representation of a geography, and the first set of cells representing a surface of the geography associated with the data value;
   computing a second covering for the constant geography object; and
   determining whether to prune at least one partition of a database including the geography data column based on a comparison between a representation of the first covering and a representation of the second covering, the database organized into a set of partitions including the at least one partition, and the database including a search index with the representation of the first covering.

2. The system of claim 1, wherein the instructions further cause the at least one hardware processor to perform operations comprising:
   computing the second covering as a second set of cells in the hierarchical grid representation of the geography, and the second set of cells representing a surface of the geography associated with the constant geography object.

3. The system of claim 2, wherein the instructions further cause the at least one hardware processor to perform operations comprising:
   computing a first extended covering for the data value, the first extended covering comprising the first set of cells and a first set of additional cells that are parent cells of the first set of cells in the hierarchical grid representation.

4. The system of claim 3, wherein the instructions further cause the at least one hardware processor to perform operations comprising:
   computing the first set of additional cells for a pre-configured number of layers in the hierarchical grid representation.

5. The system of claim 3, wherein the instructions further cause the at least one hardware processor to perform operations comprising:
   computing a hash function for each cell of the first set of cells to obtain a first set of hash functions as the representation of the first covering; and
   computing a hash function for each cell of the first set of additional cells to obtain a first additional set of hash functions.

6. The system of claim 5, wherein the instructions further cause the at least one hardware processor to perform operations comprising:
   computing the first set of hash functions based on a cell ID for each cell of the first set of cells; and
   computing the first additional set of hash functions based on a cell ID for each cell of the first set of additional cells.

7. The system of claim 5, wherein the instructions further cause the at least one hardware processor to perform operations comprising:
   computing a second extended covering for the constant geography object, the second extended covering comprising the second set of cells and a second set of additional cells that are parent cells of the second set of cells in the hierarchical grid representation.

8. The system of claim 7, wherein the instructions further cause the at least one hardware processor to perform operations comprising:
   computing a hash function for each cell of the second set of cells to obtain a second set of hash functions as the representation of the second covering, the second set of hash functions based on a cell ID for each cell of the second set of cells; and
   computing a hash function for each cell of the second set of additional cells to obtain a second additional set of hash functions, the second additional set of hash functions based on a cell ID for each cell of the second set of additional cells.

9. The system of claim 8, wherein the instructions further cause the at least one hardware processor to perform operations comprising:
   updating a filter of the search index to include the first set of hash functions and the first additional set of hash functions.

10. The system of claim 9, wherein the instructions further cause the at least one hardware processor to perform operations comprising:
determining whether to prune the at least one partition of the database based on a comparison between the second set of hash functions and the second additional set of hash functions with the first set of hash functions and the first additional set of hash functions in the filter of the search index.

11. A method comprising:
performing by at least one hardware processor operations comprising:
decoding a query with a geospatial predicate, the geospatial predicate specifying a geography data column and a constant geography object;
computing a first covering for a data value of a plurality of data values in the geography data column, the first covering including a first set of cells in a hierarchical grid representation of a geography, and the first set of cells representing a surface of the geography associated with the data value;
computing a second covering for the constant geography object; and
determining whether to prune at least one partition of a database including the geography data column based on a comparison between a representation of the first covering and a representation of the second covering, the database organized into a set of partitions including the at least one partition, and the database including a search index with the representation of the first covering.

12. The method of claim 11, further comprising:
computing the second covering as a second set of cells in the hierarchical grid representation of the geography, and the second set of cells representing a surface of the geography associated with the constant geography object.

13. The method of claim 12, further comprising:
computing a first extended covering for the data value, the first extended covering comprising the first set of cells and a first set of additional cells that are parent cells of the first set of cells in the hierarchical grid representation.

14. The method of claim 13, further comprising:
computing the first set of additional cells for a pre-configured number of layers in the hierarchical grid representation.

15. The method of claim 13, further comprising:
computing a hash function for each cell of the first set of cells to obtain a first set of hash functions as the representation of the first covering; and
computing a hash function for each cell of the first set of additional cells to obtain a first additional set of hash functions.

16. The method of claim 15, further comprising:
computing the first set of hash functions based on a cell ID for each cell of the first set of cells; and
computing the first additional set of hash functions based on a cell ID for each cell of the first set of additional cells.

17. The method of claim 15, further comprising:
computing a second extended covering for the constant geography object, the second extended covering comprising the second set of cells and a second set of additional cells that are parent cells of the second set of cells in the hierarchical grid representation.

18. The method of claim 17, further comprising:
computing a hash function for each cell of the second set of cells to obtain a second set of hash functions as the representation of the second covering, the second set of hash functions based on a cell ID for each cell of the second set of cells; and
computing a hash function for each cell of the second set of additional cells to obtain a second additional set of hash functions, the second additional set of hash functions based on a cell ID for each cell of the second set of additional cells.

19. The method of claim 18, further comprising:
updating a filter of the search index to include the first set of hash functions and the first additional set of hash functions.

20. The method of claim 19, further comprising:
determining whether to prune the at least one partition of the database based on a comparison between the second set of hash functions and the second additional set of hash functions with the first set of hash functions and the first additional set of hash functions in the filter of the search index.

21. A computer-storage medium comprising instructions that, when executed by one or more processors of a machine, configure the machine to perform operations comprising:
decoding a query with a geospatial predicate, the geospatial predicate specifying a geography data column and a constant geography object;
computing a first covering for a data value of a plurality of data values in the geography data column, the first covering including a first set of cells in a hierarchical grid representation of a geography, and the first set of cells representing a surface of the geography associated with the data value;
computing a second covering for the constant geography object; and
determining whether to prune at least one partition of a database including the geography data column based on a comparison between a representation of the first covering and a representation of the second covering, the database organized into a set of partitions including the at least one partition, and the database including a search index with the representation of the first covering.

22. The computer-storage medium of claim 21, the operations further comprising:
computing the second covering as a second set of cells in the hierarchical grid representation of the geography, and the second set of cells representing a surface of the geography associated with the constant geography object.

23. The computer-storage medium of claim 22, the operations further comprising:
computing a first extended covering for the data value, the first extended covering comprising the first set of cells and a first set of additional cells that are parent cells of the first set of cells in the hierarchical grid representation.

24. The computer-storage medium of claim 23, the operations further comprising:
computing the first set of additional cells for a pre-configured number of layers in the hierarchical grid representation.

25. The computer-storage medium of claim 23, the operations further comprising:
computing a hash function for each cell of the first set of cells to obtain a first set of hash functions as the representation of the first covering; and computing a hash function for each cell of the first set of additional cells to obtain a first additional set of hash functions.

26. The computer-storage medium of claim 25, the operations further comprising:
computing the first set of hash functions based on a cell ID for each cell of the first set of cells; and
computing the first additional set of hash functions based on a cell ID for each cell of the first set of additional cells.

27. The computer-storage medium of claim 25, the operations further comprising:
computing a second extended covering for the constant geography object, the second extended covering comprising the second set of cells and a second set of additional cells that are parent cells of the second set of cells in the hierarchical grid representation.

28. The computer-storage medium of claim 27, the operations further comprising:
computing a hash function for each cell of the second set of cells to obtain a second set of hash functions as the representation of the second covering, the second set of hash functions based on a cell ID for each cell of the second set of cells; and
computing a hash function for each cell of the second set of additional cells to obtain a second additional set of hash functions, the second additional set of hash functions based on a cell ID for each cell of the second set of additional cells.

29. The computer-storage medium of claim 28, the operations further comprising:
updating a filter of the search index to include the first set of hash functions and the first additional set of hash functions.

30. The computer-storage medium of claim 29, the operations further comprising:
determining whether to prune the at least one partition of the database based on a comparison between the second set of hash functions and the second additional set of hash functions with the first set of hash functions and the first additional set of hash functions in the filter of the search index.

\* \* \* \* \*